United States Patent
Kang et al.

(10) Patent No.: US 11,329,713 B2
(45) Date of Patent: *May 10, 2022

(54) METHOD FOR PERFORMING BEAM FAILURE RECOVERY IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Kijun Kim, Seoul (KR)

(*) Notice: Subject to any disclaimer, the term of this patent is extended or adjusted under 35 U.S.C. 154(b) by 25 days.

This patent is subject to a terminal disclaimer.

(21) Appl. No.: 16/996,571

(22) Filed: Aug. 18, 2020

(65) Prior Publication Data

US 2020/0382197 A1 Dec. 3, 2020

Related U.S. Application Data

(63) Continuation of application No. 16/332,351, filed as application No. PCT/KR2018/010645 on Sep. 11, 2018, now Pat. No. 10,784,950.

(Continued)

(51) Int. Cl.
*H04B 7/08* (2006.01)
*H04W 72/04* (2009.01)
(Continued)

(52) U.S. Cl.
CPC .......... *H04B 7/088* (2013.01); *H04B 7/0417* (2013.01); *H04B 7/0456* (2013.01);
(Continued)

(58) Field of Classification Search
CPC .. H04B 17/327; H04B 7/0417; H04B 7/0456; H04B 7/0617; H04B 7/063;
(Continued)

(56) References Cited

U.S. PATENT DOCUMENTS

| 10,784,950 B2* | 9/2020 | Kang ................. H04W 48/16 |
| 2018/0205585 A1 | 7/2018 | Sadiq et al. |

(Continued)

FOREIGN PATENT DOCUMENTS

| WO | 2017024516 | 2/2017 |
| WO | 2017151876 | 9/2017 |

OTHER PUBLICATIONS

Korean Intellectual Property Office Application No. 10-2018-7038064, Office Action dated Jul. 29, 2019, 5 pages.

(Continued)

*Primary Examiner* — Kashif Siddiqui
(74) *Attorney, Agent, or Firm* — Lee, Hong, Degerman, Kang & Waimey PC

(57) ABSTRACT

This specification provides a beam failure recovery method in a wireless communication system. In this specification, a beam failure recovery method performed by a UE includes: receiving, from a base station, control information related to a candidate beam configuration for the beam failure recovery; selecting an RS having a quality of the threshold or more among the RSs related to the candidate beam identification; and; transmitting, to the base station, a beam failure recovery request based on an uplink (UL) resource related to the selected RS.

18 Claims, 19 Drawing Sheets

Related U.S. Application Data

(60) Provisional application No. 62/565,158, filed on Sep. 29, 2017, provisional application No. 62/557,063, filed on Sep. 11, 2017.

(51) Int. Cl.

| | | |
|---|---|---|
| *H04W 48/16* | (2009.01) | |
| *H04B 7/0417* | (2017.01) | |
| *H04L 5/00* | (2006.01) | |
| *H04B 17/327* | (2015.01) | |
| *H04W 72/08* | (2009.01) | |
| *H04B 7/0456* | (2017.01) | |
| *H04B 7/06* | (2006.01) | |
| *H04W 76/19* | (2018.01) | |

(52) U.S. Cl.
CPC ......... *H04B 7/0695* (2013.01); *H04B 17/327* (2015.01); *H04L 5/00* (2013.01); *H04L 5/0048* (2013.01); *H04W 48/16* (2013.01); *H04W 72/046* (2013.01); *H04W 72/085* (2013.01); *H04W 72/042* (2013.01); *H04W 76/19* (2018.02)

(58) Field of Classification Search
CPC ..... H04B 7/0695; H04B 7/088; H04L 27/261; H04L 5/00; H04L 5/0048; H04L 5/005; H04L 5/0051; H04L 5/0053; H04L 5/0055; H04L 5/0057; H04L 5/0094; H04W 48/16; H04W 72/042; H04W 72/046; H04W 72/085; H04W 76/19
See application file for complete search history.

(56) References Cited

U.S. PATENT DOCUMENTS

| | | |
|---|---|---|
| 2018/0219604 A1 | 8/2018 | Lu et al. |
| 2018/0227899 A1 | 8/2018 | Yu et al. |
| 2018/0278310 A1 | 9/2018 | Lee et al. |
| 2018/0288756 A1 | 10/2018 | Kia et al. |
| 2018/0302889 A1 | 10/2018 | Guo et al. |
| 2019/0253127 A1 | 8/2019 | Kang et al. |

OTHER PUBLICATIONS

Samsung, "NR beam recovery procedure", 3GPP TSG RAN WG2 Meeting #99, R2-1709587, Aug. 2017, 5 pages.
LG Electronics, "Discussion on beam failure recovery", 3GPP TSG RAN WG1 Meeting #90, R1-1713151, Aug. 2017, 5 pages.
PCT International Application No. PCT/KR2018/010645, International Search Report dated Jan. 7, 2019, 3 pages.
United States Patent and Trademark Office U.S. Appl. No. 16/332,351, Office Action dated Aug. 13, 2019, 14 pages.
Huawei, HiSilicon, "Procedure Details for Beam Failure Recovery", 3GPP TSG RAN WG1 Meeting #90. R1-1712224, 2017.
ZTE, "Discussion on mechanism to recovery from beam failure", 3GPP TSG RAN WG1 Meeting #90, R1-1712300, 2017.
Qualcomm Incorporated, "Beam recovery procedure", 3GPP TSG-RAN WG1 RAN1 #90, R1-1713402, 2017.
MediaTek Inc., "Discussion on Beam Recovery Mechanism", 3GPP TSG RAN WG1 Meeting #90, R1-1713697, 2017.
European Patent Office Application Serial No. 18854806.9, Search Report dated Jun. 8, 2020, 13 pages.
Korean Intellectual Property Office Application No. 10-2018-7038064, Notice of Allowance dated Jun. 22, 2020, 2 pages.
Ericsson, "On the use of SS for beam management and beam recovery", R1-1714295, 3GPP TSG-RAN WG1 #90. Aug. 2017, 8 pages.
LG Electronics et al., "WF on beam recovery request transmission", 3GPP TSG RAN1 meeting #90, Aug. 2017, 3 pages.

\* cited by examiner

【Figure 1】
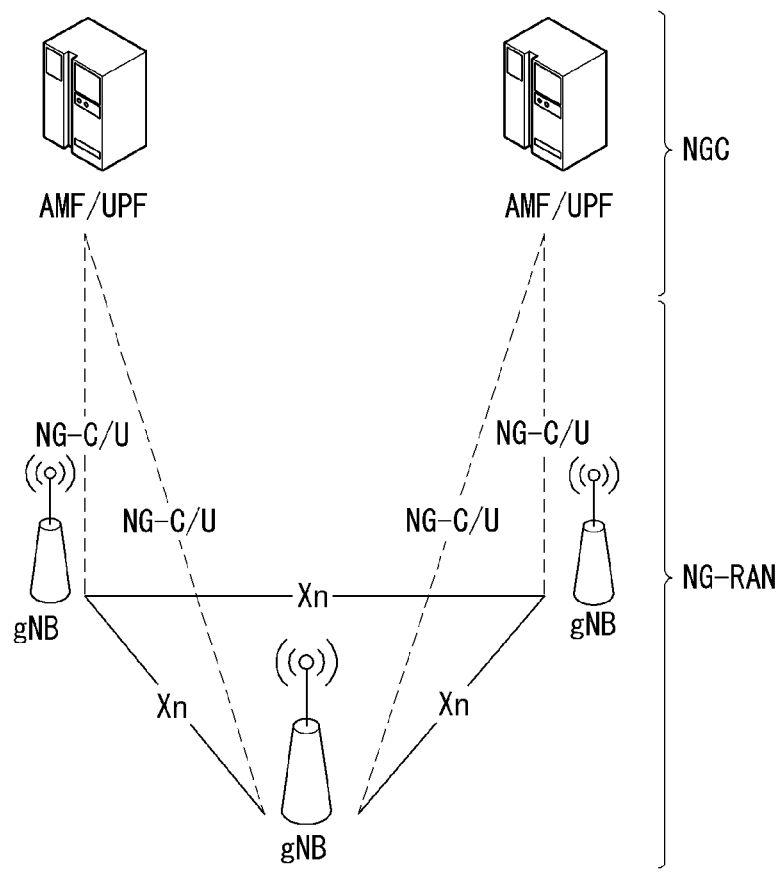
【Figure 2】
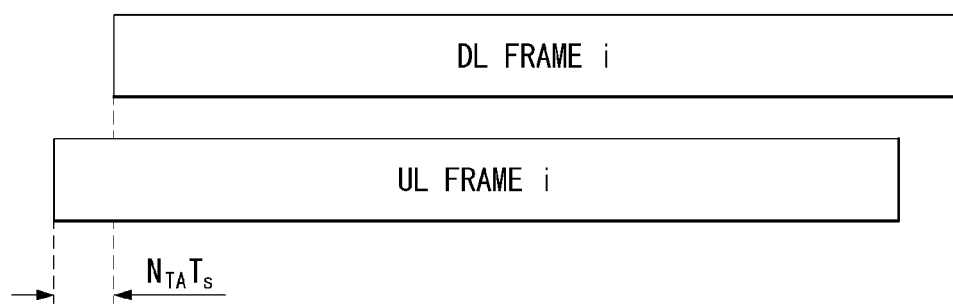

[Figure 3]
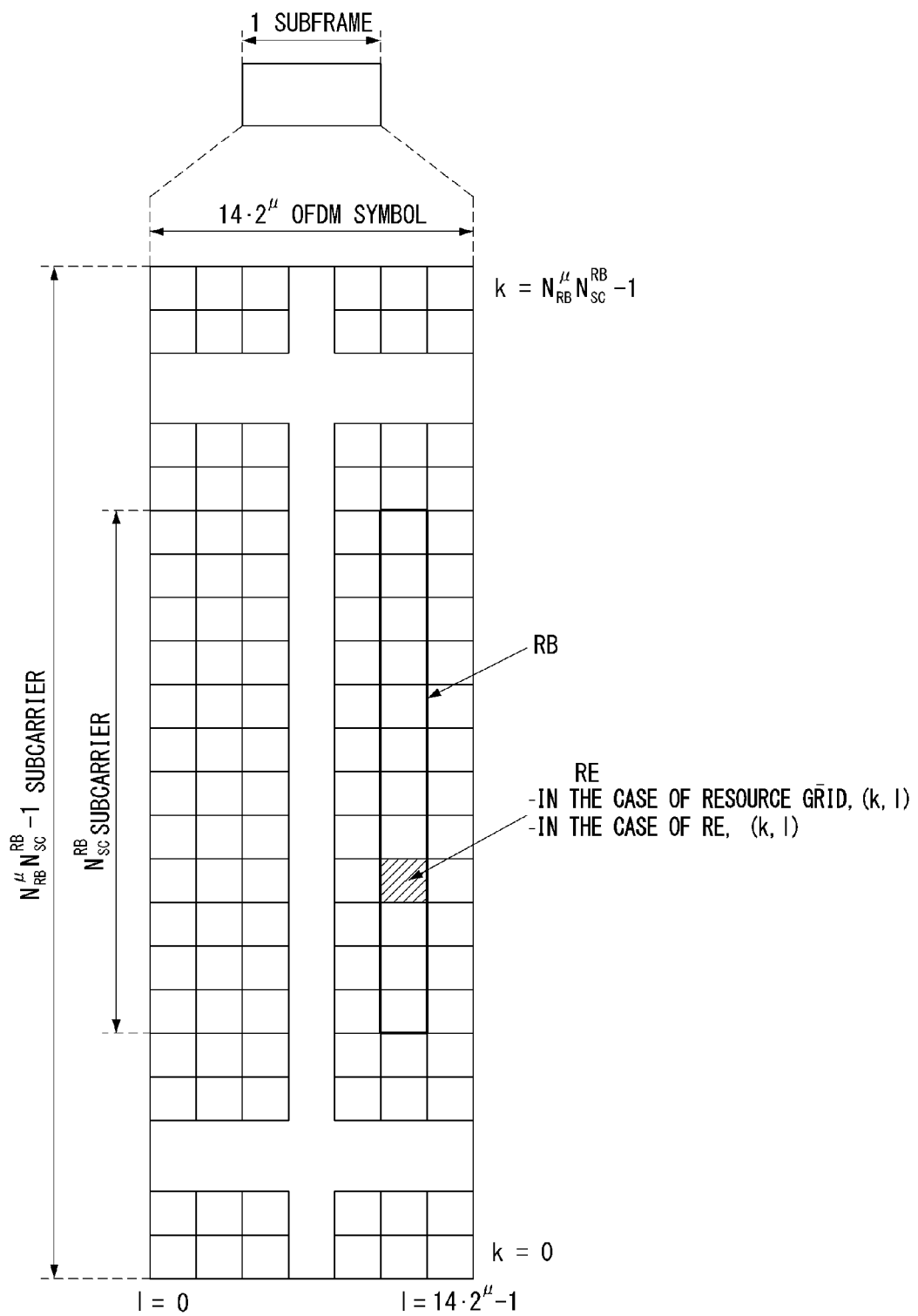

[Figure 4]
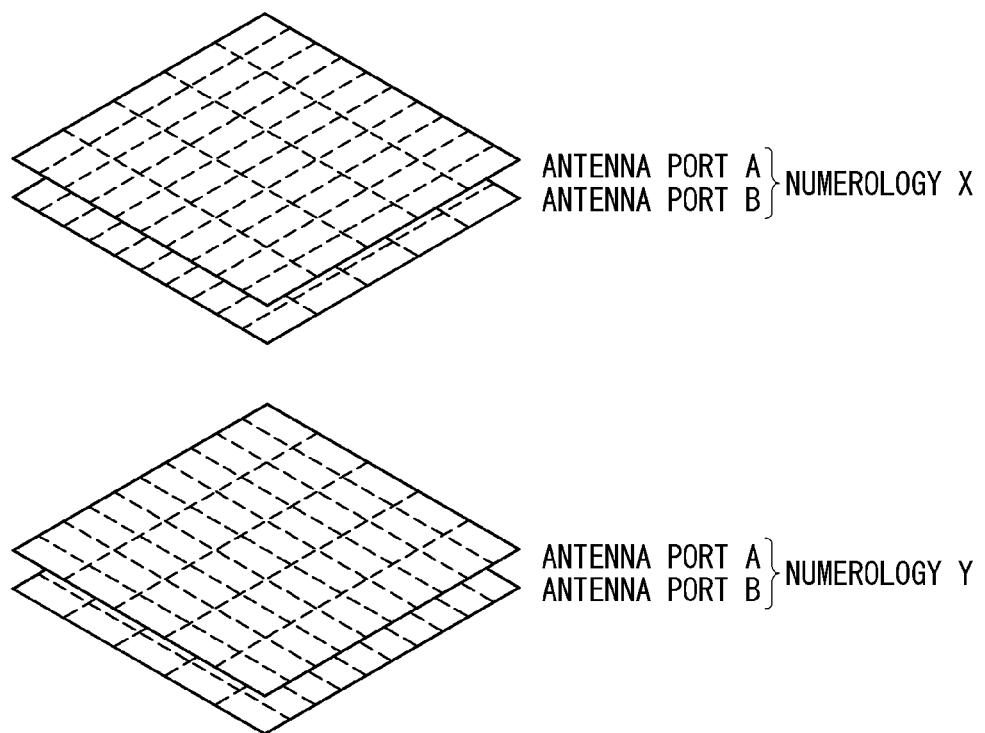

【Figure 5】
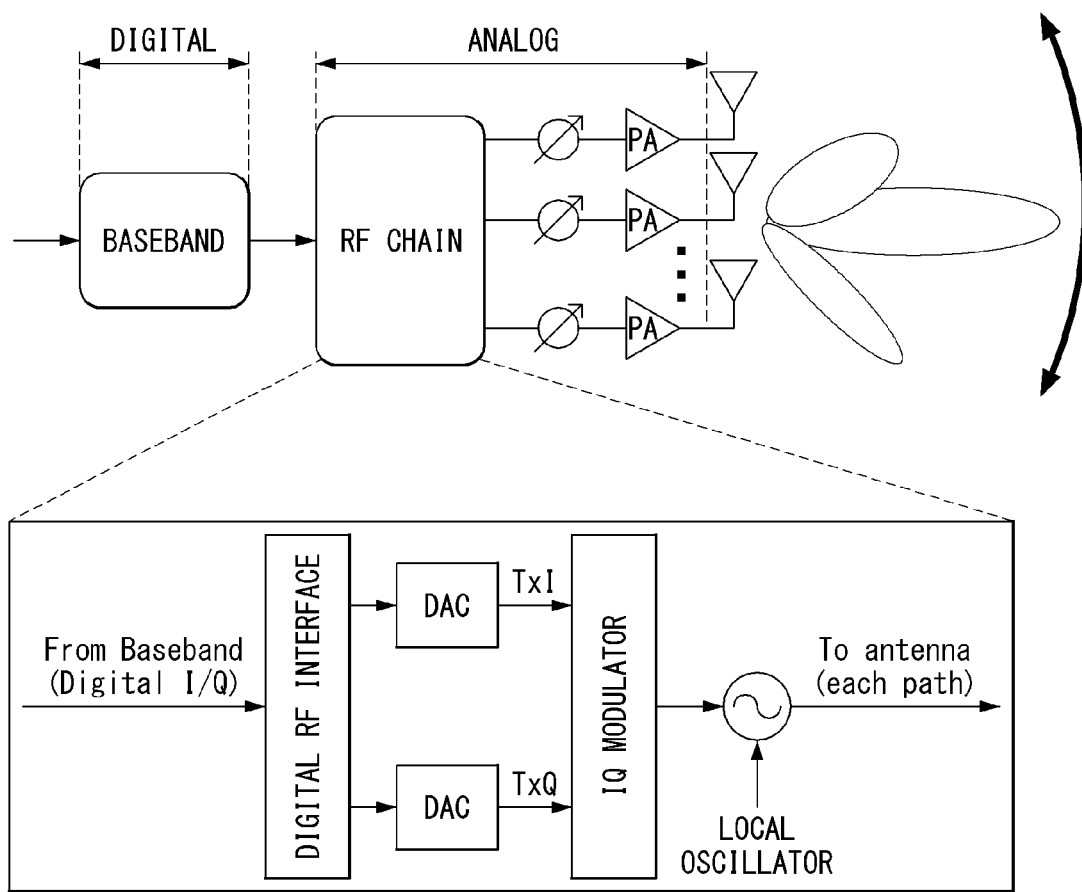

[Figure 6]
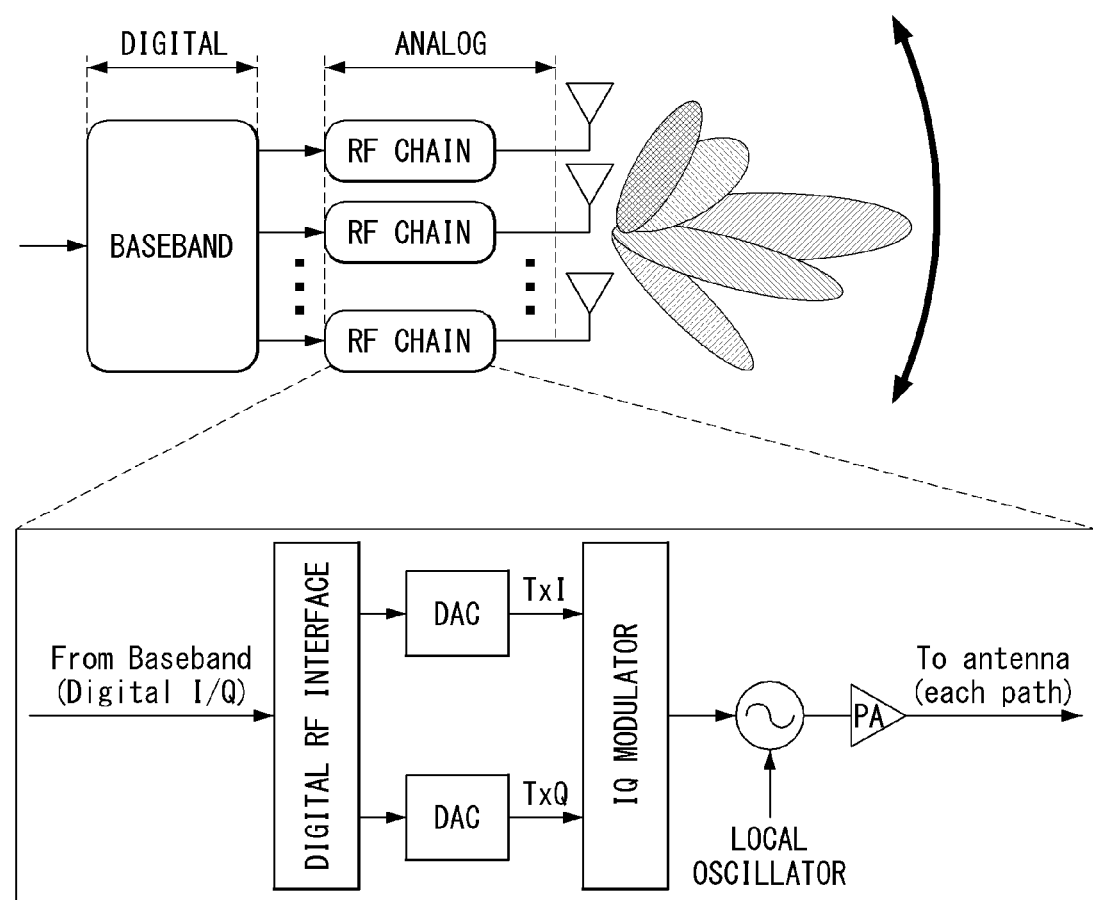

[Figure 7]
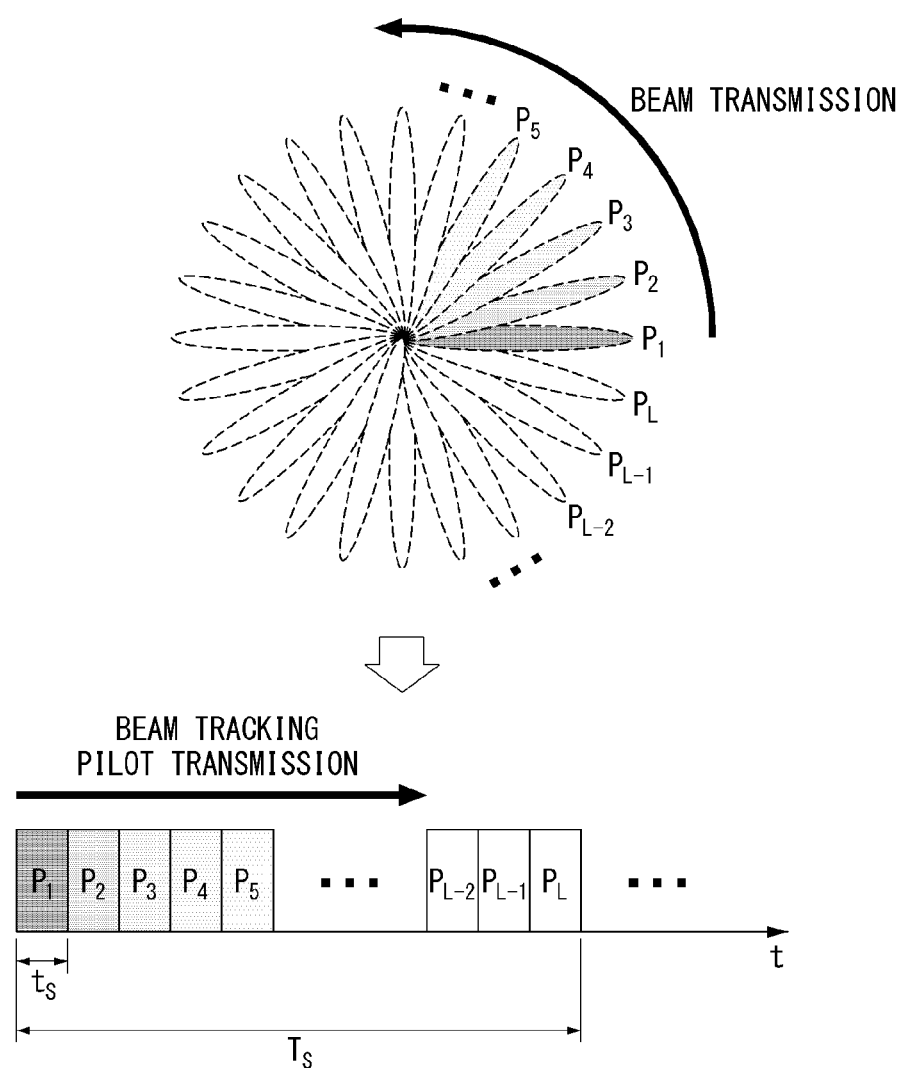

[Figure 8]

| | | PMI Feedback Type | |
|---|---|---|---|
| | | No PMI (OL, TD, single-antenna) | With PMI (CL) |
| PUSCH CQI feedback type | Wideband (Wideband CQI) | | Mode 1-2: Multiple PMI<br>RI<br>$1^{st}$ wideband CQI (4bit)<br>$2^{nd}$ wideband CQI (4bit) if RI>1<br>Subband PMIs on each subband |
| | UE Selected (subband CQI) | Mode 2-0<br>RI (only for Open-loop SM)<br>Wideband CQI (4bit) +Best-M CQI (2bit)<br>Best-M index<br><br>when RI>1, CQI of first codeword | Mode 2-2: Multiple PMI<br>RI<br>$1^{st}$ wideband CQI (4bit)+Best-M CQI (2bit)<br>$2^{nd}$ wideband CQI (4bit)+Best-M CQI (2bit) if RI>1<br>  Wideband PMI    Best-M PMI<br>Best-M index |
| | Higher layer-configured (subband CQI) | Mode 2-0<br>RI (only for Open-loop SM)<br>Wideband CQI (4bit) +subband CQI (2bit)<br><br>when RI>1, CQI of first codeword | Mode 3-1: Single PMI<br>RI<br>$1^{st}$ wideband CQI (4bit)+subband CQI (2bit)<br>$2^{nd}$ wideband CQI (4bit)+subband CQI (2bit) if RI>1<br>Wideband PMI |

【Figure 9】

|  |  | PMI Feedback Type | |
|---|---|---|---|
|  |  | No PMI (OL, TD, single-antenna) | Single PMI (CL) |
| CQI Feedback Type | Wideband | Mode 1-0<br>RI (only for Open-loop SM)]<br>One wideband CQI (4bit)]<br>when RI>1, CQI of first codeword | Mode 1-1<br>RI]<br>Wideband CQI (4bit)<br>Wideband spatial CQI (3bit) for RI>1 ]<br>Wideband PMI (4bit) |
| | UE Selected | Mode 2-0<br>RI (only for Open-loop SM)]<br>Wideband CQI (4bit)]<br>Best-1 CQI (4bit) in each BP<br>Best-1 indicator (L-bit label) ]<br>when RI>1, CQI of first codeword | Mode 2-1<br>RI]<br>Wideband CQI (4bit)<br>Wideband spatial CQI (3bit) for RI>1 ]<br>Wideband PMI (4bit)<br>Best-1 CQI (4bit) 1 in each BP<br>Best-1 spatial CQI (3bit) for RI>1 ]<br>Best-1 indicator (L-bit label) |

[Figure 10]
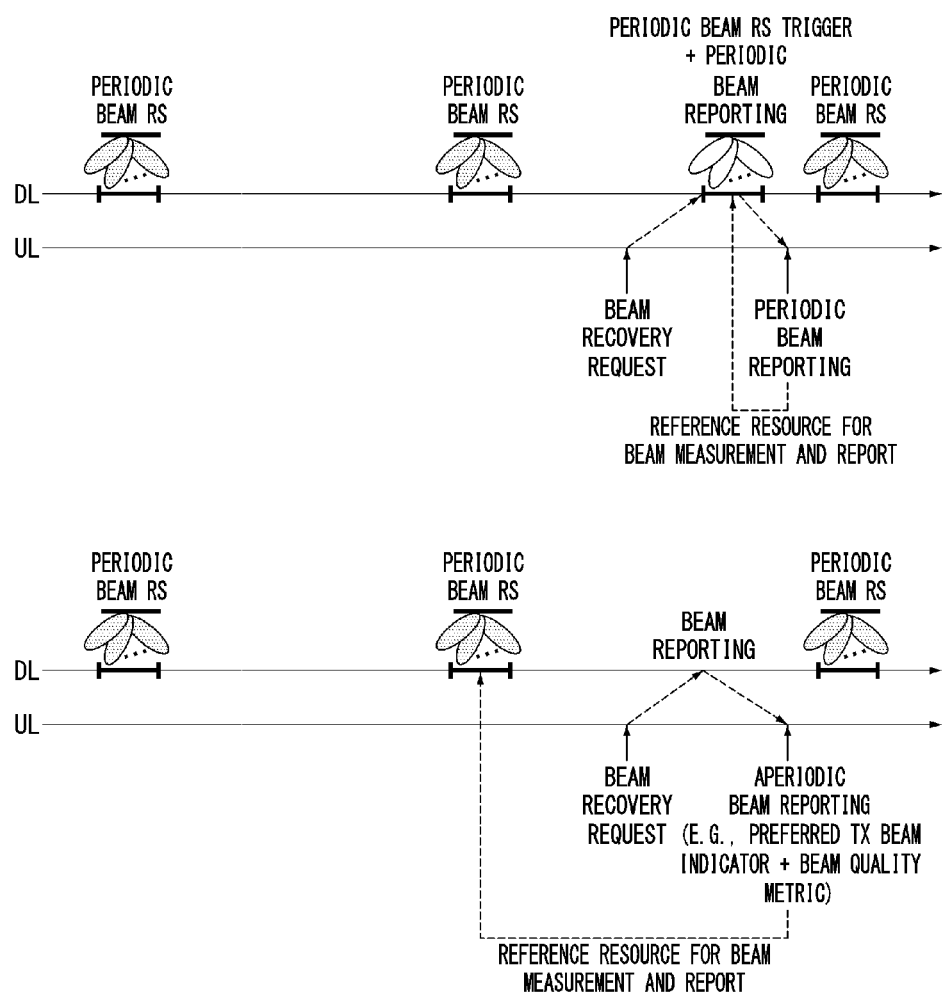

【Figure 11】
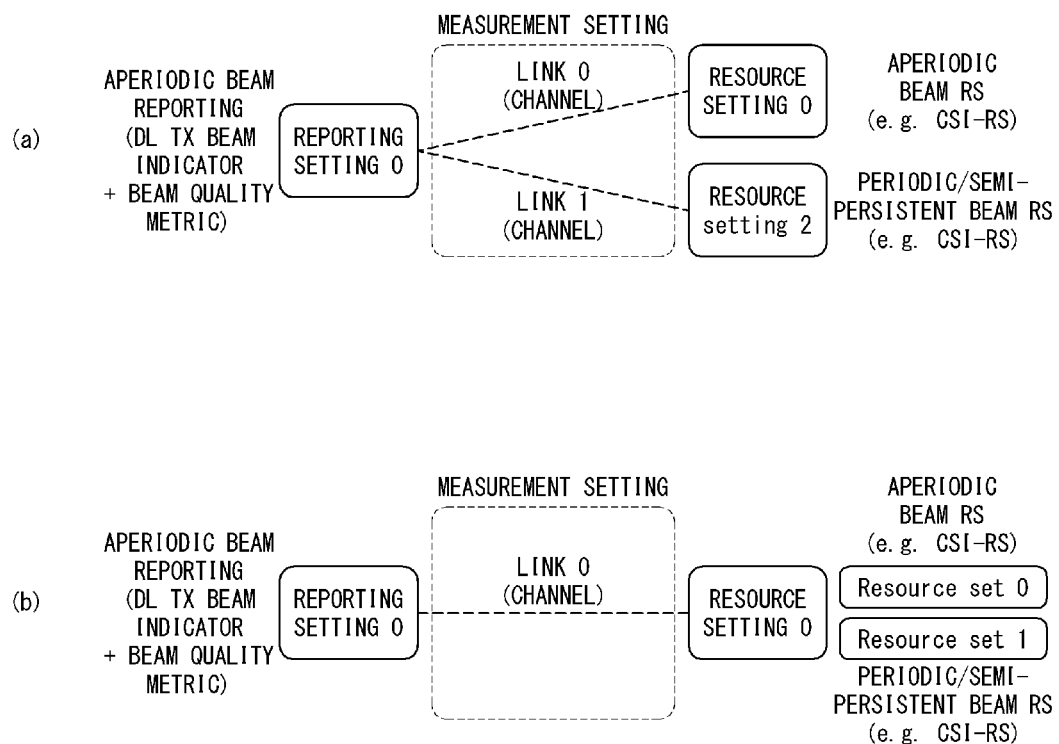

[Figure 12]
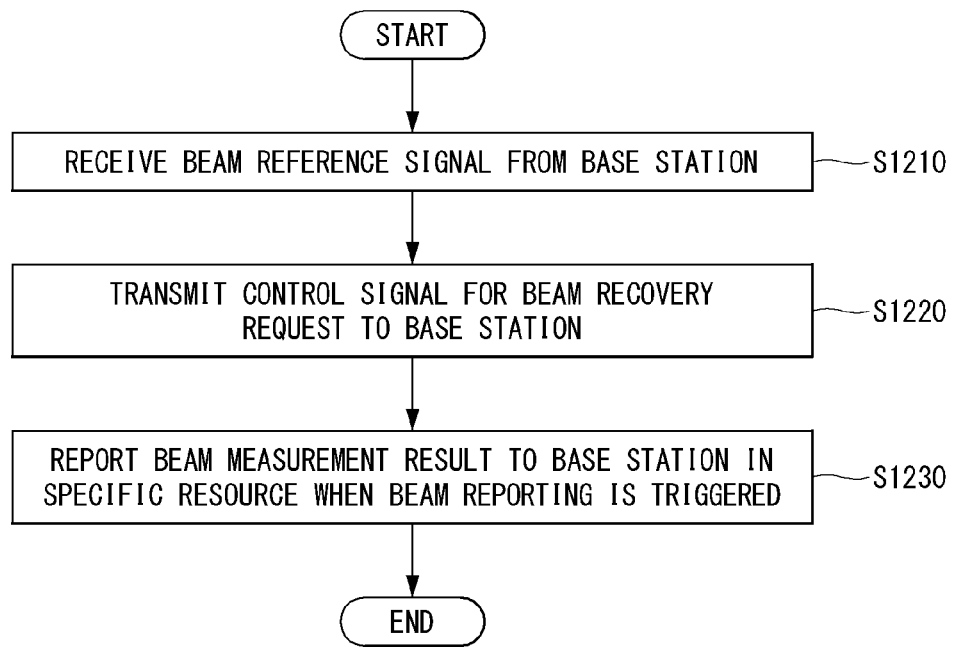
[Figure 13]
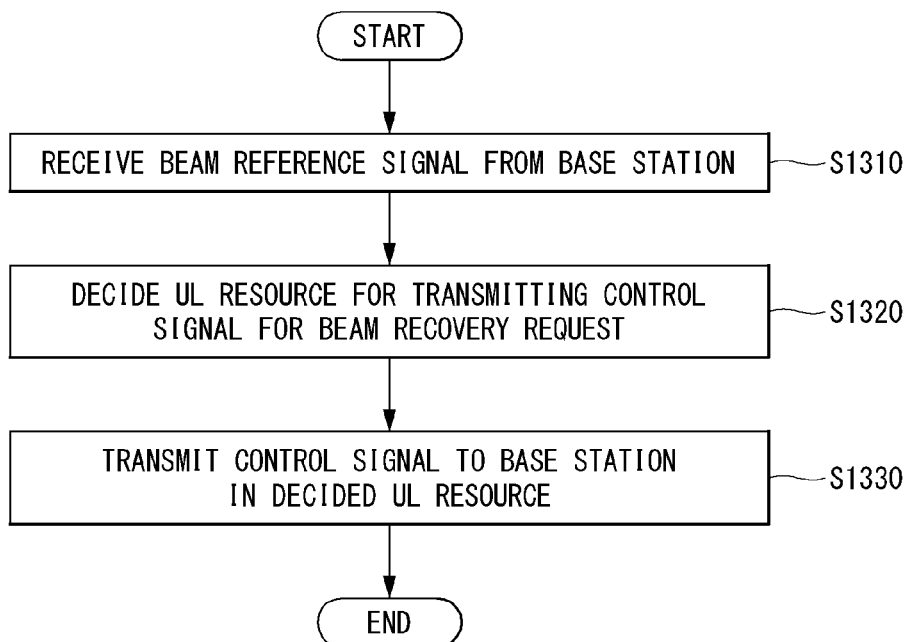

[Figure 14]
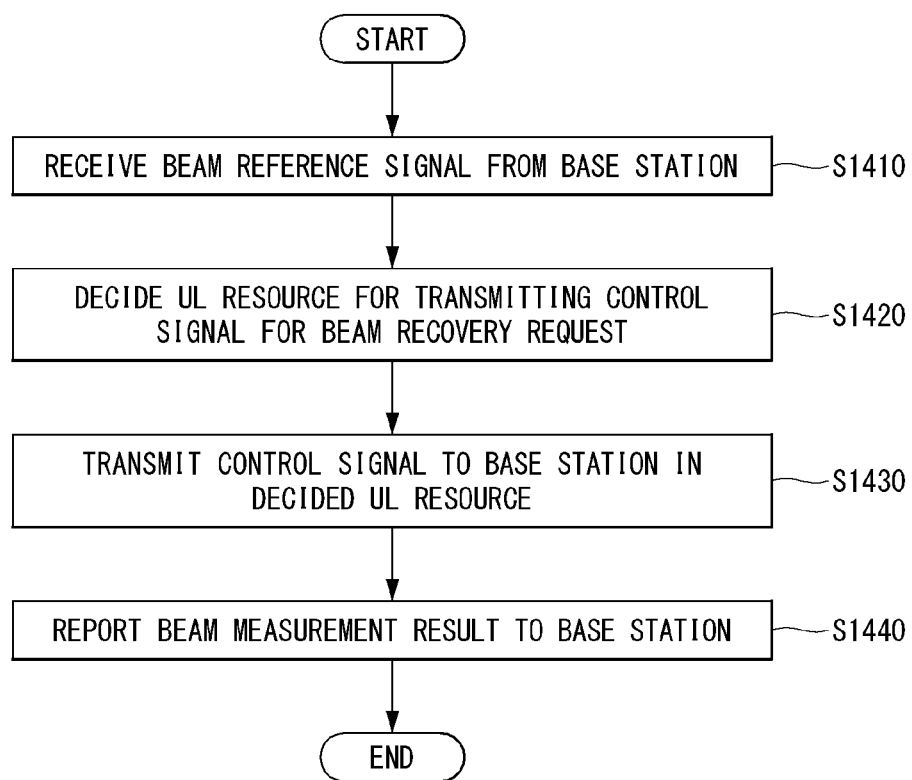

【Figure 15】
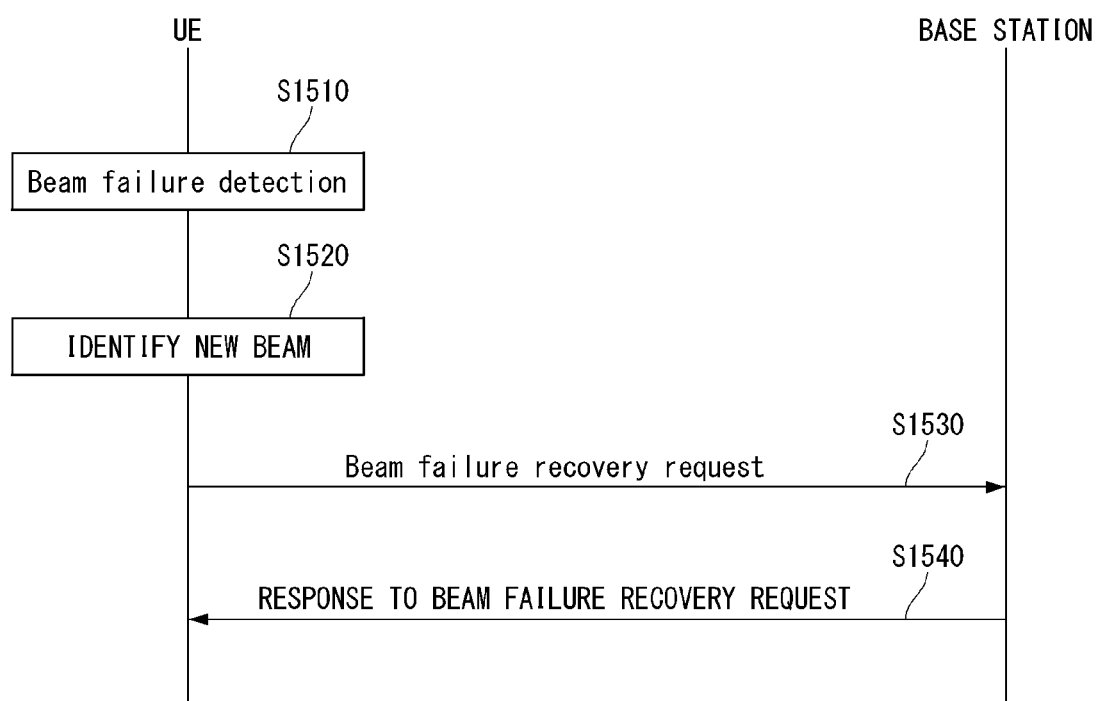

【Figure 16】
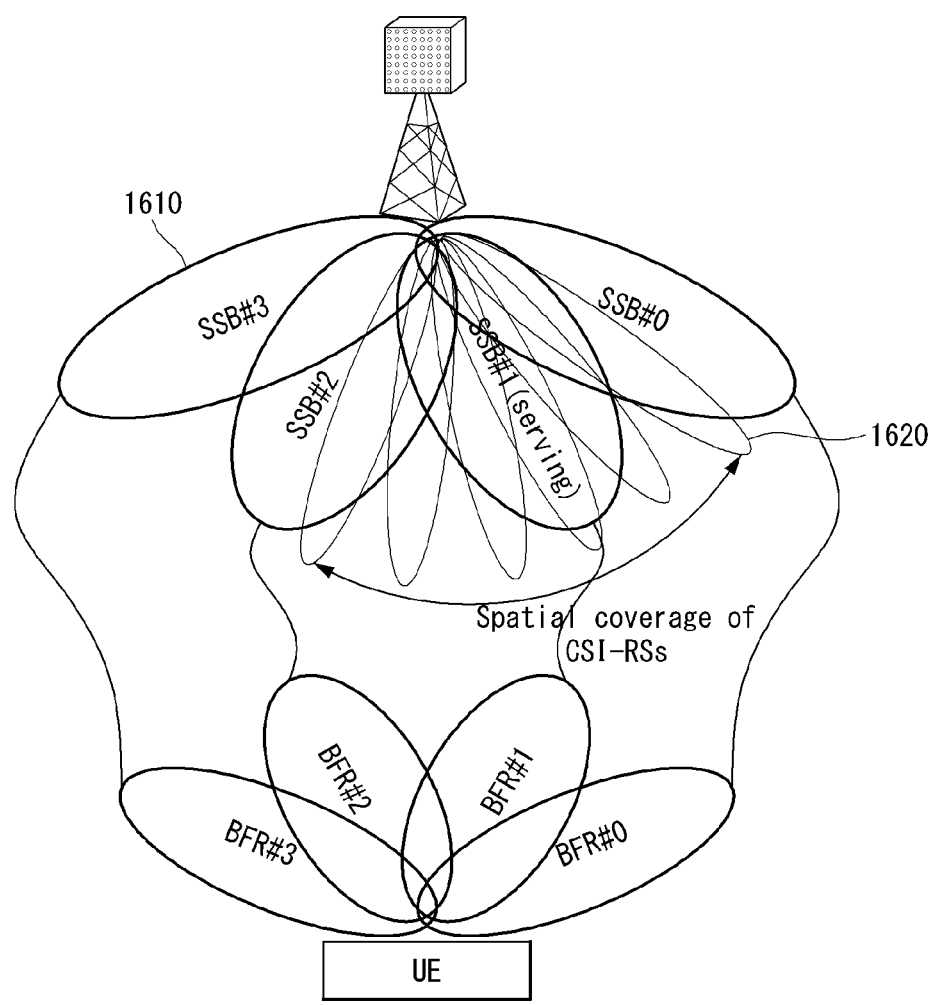

【Figure 17】
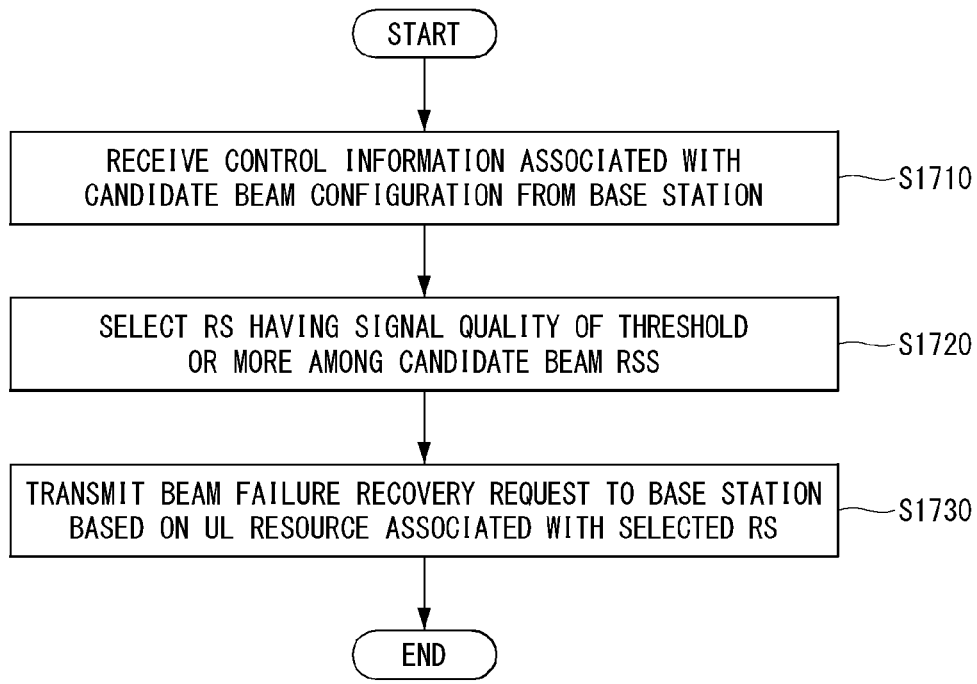
【Figure 18】
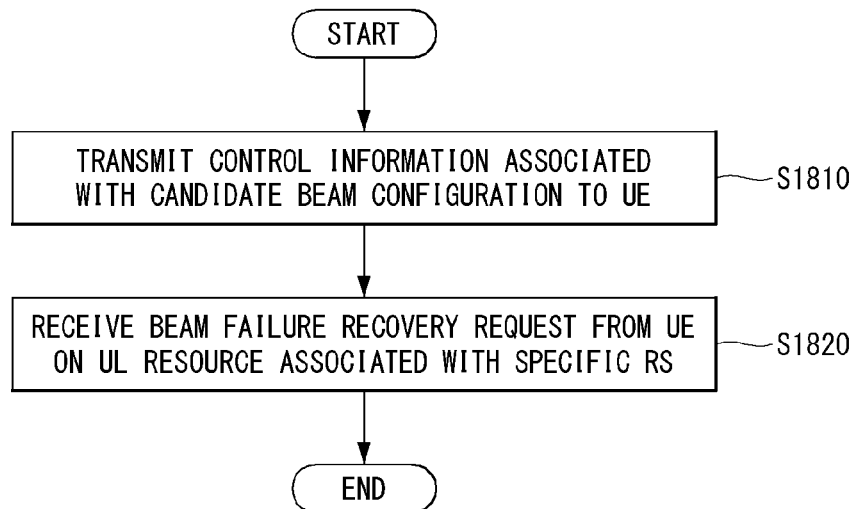

【Figure 19】
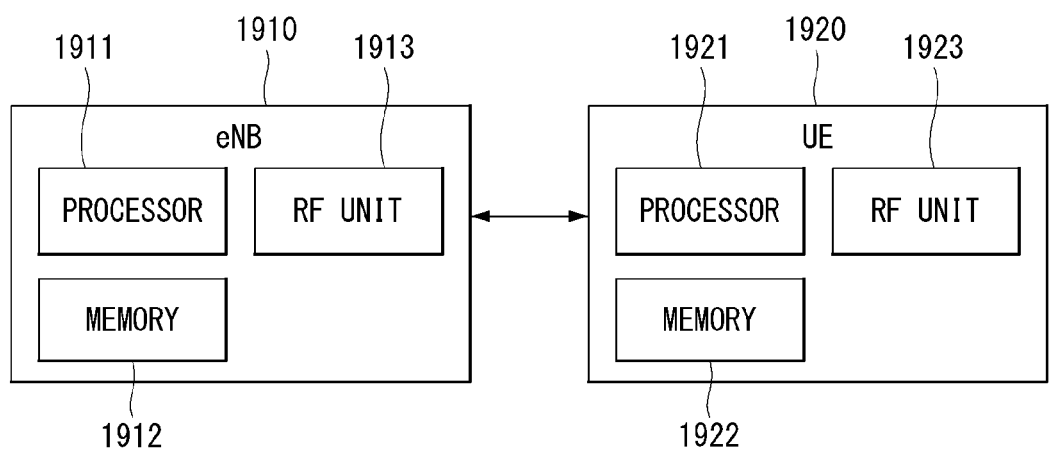

[Figure 20]
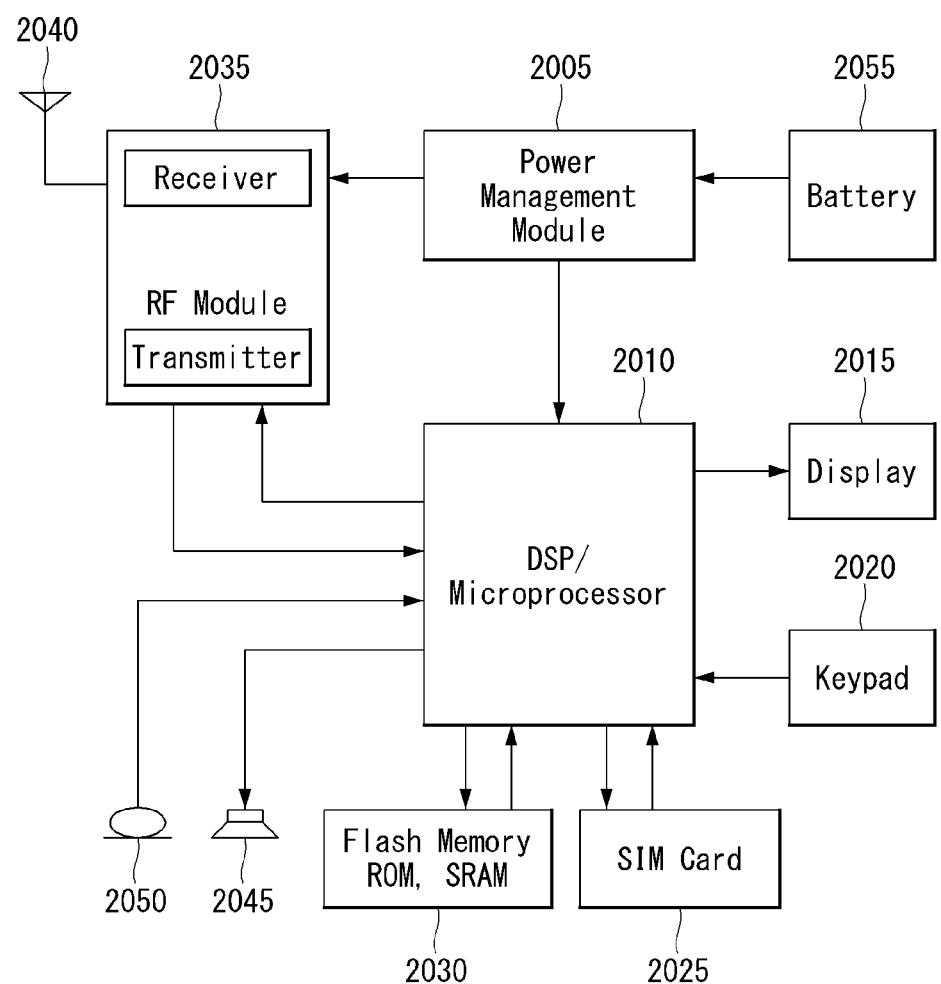

[Figure 21]
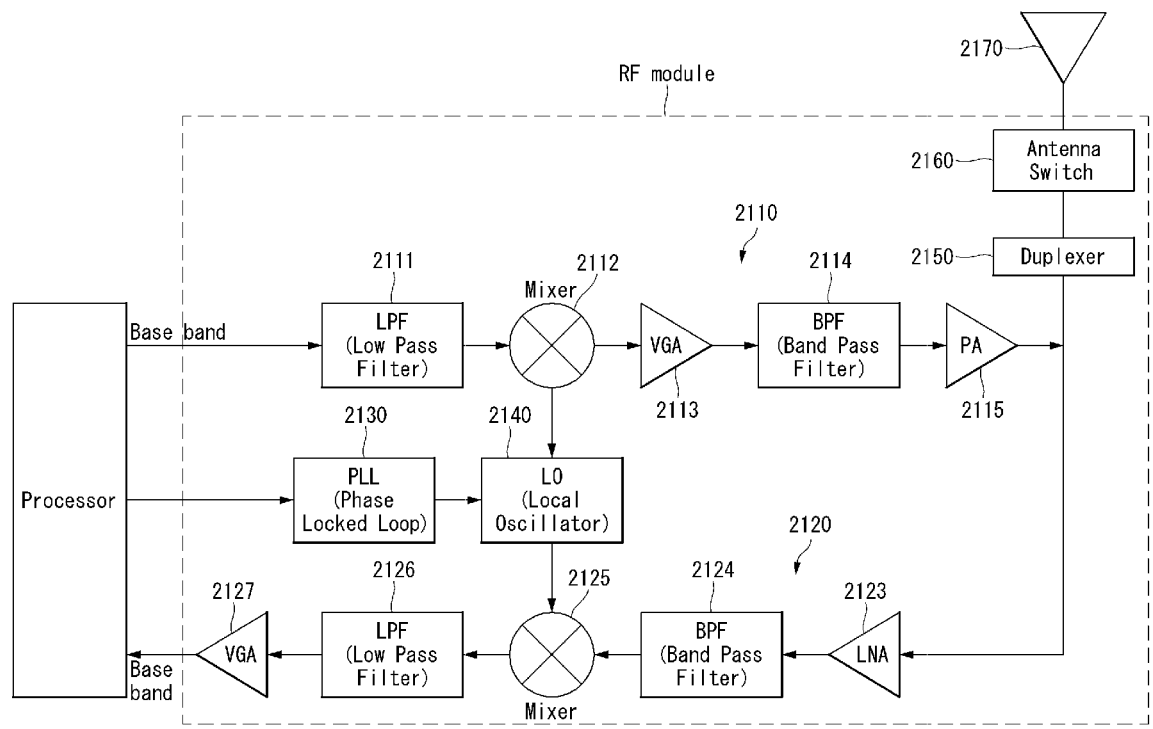

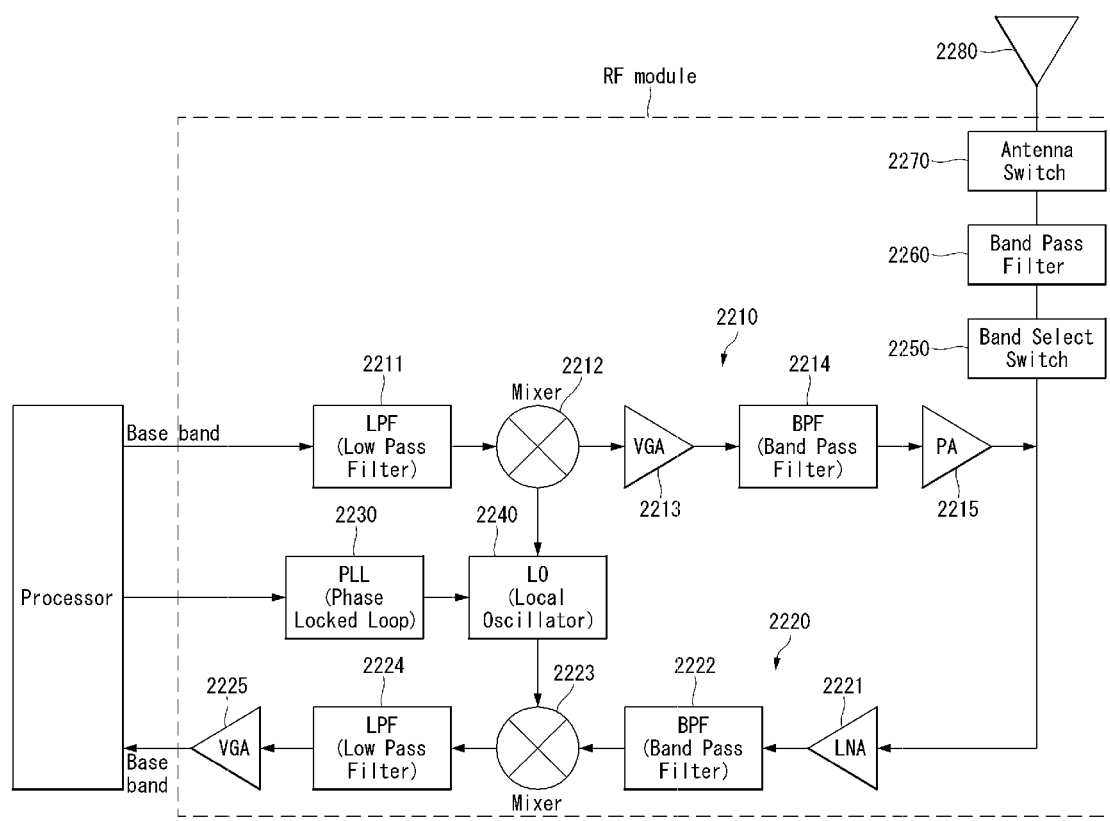
[Figure 22]

METHOD FOR PERFORMING BEAM FAILURE RECOVERY IN WIRELESS COMMUNICATION SYSTEM AND APPARATUS THEREFOR

CROSS-REFERENCE TO RELATED APPLICATIONS

This application is a continuation of U.S. patent application Ser. No. 16/332,351, filed on Mar. 11, 2019, now U.S. Pat. No. 10,784,950, which is the National Stage filing under 35 U.S.C. 371 of International Application No. PCT/KR2018/010645, filed on Sep. 11, 2018, which claims the benefit of U.S. Provisional Application Nos. 62/557,063, filed on Sep. 11, 2017, and 62/565,158, filed on Sep. 29, 2017, the contents of which are all hereby incorporated by reference herein in their entireties.

TECHNICAL FIELD

The present invention relates to a wireless communication system, and more particularly, to a method for performing a beam failure recovery in a wireless communication system and an apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An embodiment of this specification provides a method for identifying a new beam for a beam failure recovery.

Furthermore, an embodiment of this specification provides a method for configuring a resource for requesting a beam failure recovery.

The technical objects of the present invention are not limited to the aforementioned technical objects, and other technical objects, which are not mentioned above, will be apparently appreciated by a person having ordinary skill in the art from the following description.

Technical Solution

In this specification, a method for performing a beam failure recovery method by a UE in a wireless communication system includes: receiving, from a base station, control information related to a candidate beam configuration for the beam failure recovery, wherein the control information includes an RS set including reference signals (RSs) related to candidate beam identification and a threshold for the beam failure recovery; selecting an RS having a quality of the threshold or more among the RSs related to the candidate beam identification; and; transmitting, to the base station, a beam failure recovery request based on an uplink (UL) resource related to the selected RS.

Furthermore, in this specification, the UL resource is a resource related to a physical random access channel (PRACH).

Furthermore, in this specification, the UL resource is a physical random access channel (PRACH) preamble.

Furthermore, in this specification, the UR resource is a contention-free physical random access channel (PRACH) preamble.

Furthermore, in this specification, the RS set includes at least one of at least one synchronization signal (SS) block or at least one channel state information (CSI)-RS.

Furthermore, in this specification, the selected RS is the SS block.

Here, when the selected RS is the SS block, the UL resource associated with the selected RS is a UL resource corresponding to the SS block.

Furthermore, in this specification, the selected RS may be the CSI-RS and the UL resource is a UL resource corresponding to the SS block which is quasi-co located (QCL) with the CSI-RS.

Here, the SS block is an SS block QCL with the CSI-RS in terms of a spatial Rx parameter.

Here, the SS block is directly associated with the UL resource, and the CSI-RS is indirectly associated with the UL resource through a QCL association with the SS block.

Furthermore, in this specification, the quality is reference signal received power (RSRP).

Furthermore, in this specification, the UL resource is associated with one SS block and associated with one or more CSI-RSs.

Furthermore, in this specification, a method for performing a beam failure recovery by a base station in a wireless communication system includes: transmitting, to a UE, control information related to a candidate beam configuration for the beam failure recovery, wherein the control information includes an RS set including reference signals (RSs) related to candidate beam identification and a threshold for the beam failure recovery; and receiving, from UE, a beam failure recovery request based on an uplink (UL) resource related to a specific RS.

Furthermore, in this specification, the specific RS is an RS having a quality of the threshold or more among the RSs related to the candidate beam identification.

Furthermore, in this specification, a UE performing a beam failure recovery in a wireless communication system includes: a radio frequency (RF) module for transmitting and receiving a radio signal; and a processor functionally connected with the RF module, wherein the processor is configured to receive, from a base station, control information related to a candidate beam configuration for the beam failure recovery, wherein the control information includes an RS set including reference signals (RSs) related to candidate beam identification and a threshold for the beam failure recovery, select an RS having a quality of the threshold or more among the RSs related to the candidate beam identification, and transmit, to the base station, a beam failure recovery request based on an uplink (UL) resource related to the selected RS.

Advantageous Effects

This specification is advantageous in that a beam failure recovery procedure can be performed by designing a configuration for identifying a new beam and a resource for requesting a beam failure recovery when in case of beam failure.

Advantages which can be obtained in the present invention are not limited to the aforementioned effects and other unmentioned advantages will be clearly understood by those skilled in the art from the following description.

DESCRIPTION OF DRAWINGS

In order to help understanding of the present invention, the accompanying drawings which are included as a part of the Detailed Description provide embodiments of the present invention and describe the technical features of the present invention together with the Detailed Description.

FIG. 1 is a diagram illustrating an example of an overall system structure of NR to which a method proposed in this specification may be applied.

FIG. 2 illustrates a relationship between an uplink frame and a downlink frame in a wireless communication system to which the method proposed in this specification may be applied.

FIG. 3 illustrates an example of a resource grid supported in the wireless communication system to which the method proposed in this specification may be applied.

FIG. 4 illustrates examples of a resource grid for each antenna port and numerology to which the method proposed in this specification may be applied.

FIG. 5 illustrates an example of a block diagram of a transmitter constituted by an analog beamformer and an RF chain.

FIG. 6 illustrates an example of a block diagram of a transmitter constituted by a digital beamformer and an RF chain.

FIG. 7 illustrates an example of an analog beam scanning scheme.

FIG. 8 is a diagram illustrating an example of a PUSCH CSI reporting mode.

FIG. 9 is a diagram illustrating an example of a PUCCH CSI reporting mode.

FIG. 10 illustrates an example of a network operation depending on whether there is an alternative beam.

FIG. 11 is a diagram illustrating an example of a beam related configuration method.

FIG. 12 is a flowchart illustrating an example of a method for performing a beam recovery.

FIG. 13 is a flowchart illustrating an example of an operation of a UE performing a beam recovery.

FIG. 14 is a flowchart illustrating another example of an operation of a UE performing a beam recovery.

FIG. 15 is a flowchart illustrating an example of a beam failure recovery procedure.

FIG. 16 is a diagram illustrating an example of spatial coverage of CSI-RS and SS blocks that may be applied to a method proposed by this specification.

FIG. 17 is a flowchart illustrating an example of an operation method of a UE for a beam failure recovery proposed by this specification.

FIG. 18 is a flowchart illustrating an example of an operation method of a base station for a beam failure recovery proposed by this specification.

FIG. 19 illustrates a block diagram of a wireless communication apparatus according to an embodiment of the present invention.

FIG. 20 illustrates a block diagram of a communication device according to an embodiment of the present invention.

FIG. 21 is a diagram illustrating an example of an RF module of the wireless communication device to which the method proposed by this specification may be applied.

FIG. 22 is a diagram illustrating another example of the RF module of the wireless communication device to which the method proposed by this specification may be applied.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC- FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured for the numerology μ and an antenna port p.

FIG. 4 shows an example of antenna ports and ringer-specific resource grids to which the method proposed herein can be applied.

Each element of the resource grid for the numerology μ and the antenna port p is indicated as a resource element, and may be uniquely identified by an index pair (k,l). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l) is used. Herein $l=0, \ldots, N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Uplink Control Channel

Physical uplink control signaling should be able to at least carry hybrid-ARQ acknowledgment, CSI report (including beamforming information if possible), and a scheduling request.

At least two transmission methods are supported for the UL control channel supported by the NR system.

The uplink control channel may be transmitted around a last transmitted uplink symbol(s) of a slot in short duration. In this case, the uplink control channel is time-division-multiplexed and/or frequency-division-multiplexed with an uplink (UL) data channel in the slot. One-symbol unit transmission of the slot is supported with respect to the uplink control channel of the short duration.

- Short uplink control information (UCI) and data are frequency-division-multiplexed at least between the UE and the UE in the case where the physical resource blocks (PRBs) for the short UCI and the data do not overlap.
- In order to support time division multiplexing (TDM) of short PUCCH from different UEs in the same slot, a mechanism for notifying to the UE whether the symbol(s) in the slot to transmit the short PUCCH is supported at least at 6 GHz or more is supported.
- With respect to 1-symbol duration, supported at least are 1) that when a reference signal (RS) is multiplexed, the UCI and the RS is multiplexed to a given OFDM symbol by a frequency division multiplexing (FDM) scheme and 2) that subcarrier spacings between downlink (DL) and uplink (UL) data and the short duration PUCCH are the same as each other in the same slot.
- At least, the short duration PUCCH during 2-symbol duration is supported. In this case, the subcarrier spacings between the downlink (DL) and uplink (UL) data and the short duration PUCCH are the same as each other in the same slot.
- At least, a semi-static configuration is supported, in which a PUCCH resource of the UE given in the slot, that is, short PUCCHs of different UEs may be time-division-multiplexed within given duration.
- The PUCCH resource includes a time domain and a frequency domain and if applicable, the PUCCH resource includes a code domain.
- The short duration PUCCH may be extended to the end of the slot from the viewpoint of the UE. In this case, after the short duration PUCCH, an explicit gap symbol is not required.
- In regard to a slot (that is, a DL-centric slot) having a short UL part, when data is scheduled in a short uplink part, 'short UCI' and data may be frequency-division-multiplexed by one UE.

The uplink control channel may be transmitted over multiple uplink symbols during long duration in order to improve coverage. In this case, the uplink control channel is frequency-division-multiplexed with the uplink data channel in the slot.

- At least, a UCI carried by a long duration UL control channel may be transmitted in one slot or multiple slots by a design with a low peak to average power ratio (PAPR).
- Transmission using multiple slots is allowed for a total duration (e.g., 1 ms) in at least some cases.
- For the long duration uplink control channel, time division multiplexing (TDM) between the RS and the UCI is supported with respect to DFT-S-OFDM.
- The long UL part of the slot may be used for transmitting the long duration PUCCH. That is, the long duration PUCCH is supported with respect to both a UL-only slot and a slot having symbols of a variable number constituted by a minimum of four symbols.
- At least with respect to a 1 or 2-bit UCI, the UCI may be repeated in N (N>1) slots and the N slots may be adjacent or not adjacent in slots in which the long duration PUCCH is allowed.
- At least, simultaneously transmission of the PUSCH and the PUCCH is supported with respect to a long PUCCH. That is, even when there is data, the uplink control for the PUCCH resource is transmitted. Further, in addition to the simultaneous transmission of the PUCCH and the PUSCH, the UCI in the PUSCH is supported.
- Intra-TTI slot frequency hopping is supported.
- A DFT-s-OFDM waveform is supported.
- A transmit antenna diversity is supported.

TDM and FDM between the short duration PUCCH and the long duration PUCCH are supported for other UEs in at least one slot. In the frequency domain, the PRB (or multiple PRBs) is the minimum resource unit size for the UL control channel. When hopping is used, frequency resources and hopping may not spread to a carrier bandwidth. Further, a UE-specific RS is used for NR-PUCCH transmission. A set of PUCCH resources is configured by higher layer signaling and the PUCCH resources within the configured set are indicated by downlink control information (DCI).

As part of the DCI, the timing between data reception and hybrid-ARQ acknowledgment transmission should be dynamically (at least together with RRC) indicated. A combination of the semi-static configuration and dynamic signaling (for at least some types of UCI information) is used to determine the PUCCH resource for 'long and short PUCCH formats'. Here, the PUCCH resource includes the time domain and the frequency domain and, if applicable, the PUCCH resource includes the code domain. Using UCI on the PUSCH, that is, a part of the scheduled resource for the UCI is supported in the case of simultaneous transmission of the UCI and the data.

Further, at least a single HARQ-ACK bit uplink transmission is supported at least. In addition, a mechanism is supported, which enables the frequency diversity. Further, in the case of Ultra-Reliable and Low-Latency Communication (URLLC), a time interval between scheduling (SR) resources configured for the UE may be smaller than one slot.

Beam Management

In NR, beam management is defined as follows.

Beam management: A set of L1/L2 procedures for obtaining and maintaining a set of TRP(s) and/or UE beams that may be used for DL and UL transmission/reception, including at least:

- Beam determination: operation of the TRP(s) or the UE selecting transmission/reception beam thereof
- Beam measurement: operation of the TRP(s) or the UE selecting transmission/reception beam thereof
- Beam reporting: operation in which the UE reports information of a beamformed signal based on beam measurement.
- Beam sweeping: operation of covering a spatial region using a transmitted and/or received beam for a time interval in a predetermined scheme.

Further, Tx/Rx beam correspondence in the TRP and the UE is defined as follows:

The Tx/Rx beam correspondence in the TRP is maintained if at least one of the followings is satisfied:
- The TRP may determine a TRP reception beam for uplink reception based on the UE's downlink measurement for one or more transmission beams of the TRP.
- The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

An ability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting, M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting

Time domain operation (e.g., aperiodic operation, periodic operation, semi-persistent operation)

Frequency granularity when multiple frequency granularities are supported

Resource setting that includes at least:

Time domain operation (e.g., aperiodic operation, periodic operation, semi-persistent operation)

RS type: at least NZP CSI-RS

At least one CSI-RS resource set. Each CSI-RS resource set includes K≥1 CSI-RS resources (Some parameters of K CSI-RS resources may be the same. For example, port number, a time domain operation, density, and periodicity)

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating N1 DL transmission beams The group-based beam reporting as described above may be configured on a UE-by-UE basis. Further, the group-based beam reporting may be turned off on the UE-by-UE basis (e.g., when L=1 or N1=1).

NR supports that UE may trigger a mechanism to recover from the beam failure.

A beam failure event occurs when a quality of a beam pair link of an associated control channel is sufficiently low (e.g., a comparison with a threshold, a timeout of an associated timer). The mechanism to recover the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, this information also indicates the RS antenna port QCLed with the DMRS antenna port. A different set of DMRS antenna ports for a DL data channel may be represented as a different set of RS antenna ports and a QCL.

Hybrid Beamforming

Conventional beamforming techniques using multiple antennas may be classified into an analog beamforming technique and a digital beamforming technique depending on a location of applying a beamforming weight vector/precoding vector.

The analog beamforming technique is a beamforming technique applied to an initial multi-antenna structure. The technique may mean a technique of forming the beam by branching an analog signal that has been subjected to digital signal processing to multiple paths and applying phase shift (PS) and a power amplifier (PA) configuration to each path.

For analog beamforming, a structure is required in which the PA and the PS connected to each antenna process analog signals derived from a single digital signal. In other words, in an analog stage, the PA and the PS process complex weights.

FIG. 5 illustrates an example of a block diagram of a transmitter constituted by an analog beamformer and an RF chain. FIG. 5 is just for convenience of the description and does not limit the scope of the present invention.

In FIG. 5, an RF chain refers to a processing block in which a baseband (BB) signal is converted into an analog signal. In the analog beamforming technique, accuracy of the beam is determined according to element characteristics of the PA and the PS and may be advantageous for narrow-band transmission due to control characteristics of the elements.

Further, since the analog beamforming technique is configured in a hardware structure in which it is difficult to implement multi-stream transmission, a multiplexing gain for increasing transmission rate is relatively small. In addition, in this case, beamforming for each UE based on orthogonal resource allocation may not be easy.

In contrast, in the case of the digital beamforming technique, the beamforming is performed at a digital stage using a Baseband (BB) process in order to maximize diversity and the multiplexing gain in an MIMO environment.

FIG. 6 illustrates an example of a block diagram of a transmitter constituted by a digital beamformer and an RF chain. FIG. 6 is just for convenience of the description and does not limit the scope of the present invention.

In the case of FIG. 6, the beamforming may be performed as precoding is performed in the BB process. Here, the RF chain includes the PA. The reason is that in the case of the digital beamforming technique, the complex weight derived for the beamforming is directly applied to transmitted data.

In addition, since different beamforming may be performed for each UE, it is possible to support multi-user beamforming at the same time. Moreover, independent beamforming is possible for each UE to which orthogonal resources are allocated, so that flexibility of scheduling is enhanced, and thus, the transmitter corresponding to a system objective may be operated. Further, when a technique such as MIMO-OFDM is applied in an environment supporting wideband transmission, an independent beam may be formed for each subcarrier.

Therefore, the digital beamforming technique may maximize maximum transmission rate of a single UE (or user) based on a capacity increase of the system and an enhanced beam gain. Based on features described above, the conventional 3G/4G (e.g., LTE(-A)) system introduces a digital beamforming based MIMO scheme.

In the NR system, a massive MIMO environment in which the number of transmission/reception antennas greatly increases may be considered. Generally, in cellular communication, it is assumed that the maximum number of transmission/reception antennas applied to the MIMO environment is eight. However, as a large MIMO environment is considered, the number of the transmission/reception antennas may increase to several tens or several hundreds.

In this case, when the digital beamforming technique described above is applied in the large MIMO environment, the transmitter must perform signal processing for hundreds of antennas through the BB process for digital signal processing. Accordingly, complexity of the signal processing becomes very large and the RF chains as many as the antennas are required, so that the complexity of hardware implementation may also greatly increase.

Further, the transmitter needs independent channel estimation for all of the antennas. In addition, in the case of the FDD system, the transmitter requires feedback information on a large MIMO channel constituted by all of the antennas, so that pilot and/or feedback overhead may be very large.

On the other hand, when the analog beamforming technique described above is applied in the large MIMO environment, the hardware complexity of the transmitter is relatively low.

In contrast, a degree of increase in performance using multiple antennas is very small and flexibility of resource allocation may be reduced. In particular, it is not easy to control the beam for each frequency in broadband transmission.

Therefore, in the large MIMO environment, a hybrid type transmitter configuration scheme in which analog beamforming and digital beamforming structures are combined is required instead of selecting only one of the analog beamforming and digital beamforming techniques exclusively.

Analog Beam Scanning

In general, THE analog beamforming may be used at a pure analog beamforming transceiver and at a hybrid beamforming transceiver. In this case, the analog beam scanning may perform estimation for one beam at the same time. Thus, a beam training time required for beam scanning is proportional to the total number of candidate beams.

As described above, in the case of the analog beamforming, a beam scanning process in the time domain is particularly required for the transceiver beam estimation. In this case, an estimated time is for all transmission/reception beams may be expressed as Equation 2 below.

$$T_S = t_s \times (K_T \times K_R) \quad \text{[Equation 2]}$$

In Equation 2, $t_s$ denotes a time required for scanning one beam, $K_T$ denotes the number of transmission beams, and $K_R$ denotes the number of reception beams.

FIG. 7 illustrates an example of an analog beam scanning scheme according to various embodiments of the present invention. FIG. 7 is just for convenience of the description and does not limit the scope of the present invention.

In the case of FIG. 7, it is assumed that the total number $K_T$ of transmission beams is L and the total number $K_R$ of reception beams is 1. In this case, since the total number of candidate beams is L, the L time intervals are required in the time domain.

In other words, since only one beam may be estimated in a single time interval for the analog beam estimation, as illustrated in FIG. 7, L time intervals are required to estimate all L beams $P_1$ to $P_L$. After the analog beam estimation procedure ends, the UE feeds back an identifier (e.g., ID) of a beam having a highest signal strength to the base station. That is, as the number of transmission/reception antennas increases, the number of individual beams increases, and as a result, a longer training time may be required.

Since the analog beamforming changes a size and a phase angle of a continuous waveform in the time domain after a digital-to-analog converter (DAC), training intervals for individual beams need to be guaranteed unlike the digital beamforming. Therefore, as the length of the training interval increases, efficiency of the system may decrease (i.e., loss of the system may increase).

Channel State Information (CSI) Feedback

In most cellular systems including the LTE system, the UE receives a pilot signal (reference signal) for channel estimation from the base station and calculates channel state information (CSI) and reports the calculated CSI to the base station.

The base station transmits a data signal based on the CSI information fed back from the UE.

In the LTE system, the CSI information fed back by the UE includes channel quality information (CQI), a precoding matrix index (PMI), and a rank indicator (RI).

CQI feedback is radio channel quality information provided to the base station for a purpose (link adaptation purpose) to provide a guide as to which modulation and coding scheme is to be applied when the base station transmits data.

When a radio quality between the base station and the UE is high, the UE will feed back a high CQI value and the base station will transmit data using a relatively high modulation order and low channel coding rate and in an opposite case, the UE will feed back a low CQI value and the base station will transmit data by applying a relatively low modulation order and high channel coding rate.

PMI feedback is preferred precoding matrix information provided to the base station in order to provide a guide as to which MIMO precoding scheme is to be applied when the base station has multiple antennas installed therein.

The MS estimates a downlink MIMO channel between the base station and the UE based on the pilot signal and recommends what MIMO precoding the BS should apply through the PMI feedback.

In the LTE system, only linear MIMO precoding which may be expressed in a matrix form is considered in the PMI configuration.

The base station and the UE share a codebook constituted by multiple precoding matrices and each MIMO precoding matrix in the codebook has a unique index.

Accordingly, the UE minimizes an amount of the feedback information of the UE by feeding back an index corresponding to a most preferred MIMO precoding matrix in the codebook as the PMI.

The PMI value is not particularly configured by only one index. As an example, when the number of transmission antenna ports is eight in the LTE system, a final 8tx MIMO precoding matrix may be derived only by combining two indexes (first PMI and second PMI).

RI feedback is information on the number of preferred transmission layers which the UE provides to the base station in order to provide a guide for the number of preferred transmission layers when multi-layer transmission is possible through spatial multiplexing by installing multiple antennas by the base station and the UE.

The RI has a very close relationship with the PMI. The reason is that the base station must be able to know what precoding should be applied to each layer according to the number of transmission layers.

In the PMI/RI feedback configuration, a PMI codebook may be configured based on single layer transmission and then, the PMI may be defined and fed back for each layer, but this scheme is disadvantageous in that the amount of the PMI/RI feedback information increases significantly as the number of transmission layers increases.

Therefore, in the LTE system, the PMI codebook is defined according to the number of transmission layers. That is, N matrices having a size of Nt×R are defined in the codebook for R-layer transmission (here, R represents the number of layers, Nt represents the number of transmission antenna ports, and N represents the size of the codebook).

Therefore, in the LTE, the size of the PMI codebook is defined regardless of the number of transmission layers. As a result, when the PMI/RI is defined in such a structure, the number R of transmission layers consequently matches a rank value of the precoding matrix (Nt×R matrix), and as a result, a term rank indicator (RI) is used.

The PMI/RI described in this specification is not limited to meaning an index value of the precoding matrix and a rank value of the precoding matrix expressed by the Nt×R matrix like the PMI/RI in the LTE system.

The PMI described in this specification represents preferred MIMO precoder information among MIMO precoders applicable in the transmitter and the form of the precoder is not limited to a linear precoder that may be expressed by a matrix as in the LTE system. In addition, the RI described in this specification includes all of the feedback information indicating the number of preferred transmission layers in a wider sense than the RI in the LTE.

CSI information may be obtained in an entire system frequency domain or in a partial frequency domain. In particular, it may be useful in the broadband system to obtain and feed back the CSI information for the partial frequency domain (e.g., subbands) preferred for each UE.

In the LTE system, the CSI feedback is performed through an uplink channel and in general, periodic CSI feedback is performed through a physical uplink control channel (PUCCH) and aperiodic CSI feedback is performed through a physical uplink shared channel (PUSCH) which is an uplink data channel.

The aperiodic CSI feedback means that the base station temporarily feeds back only when the base station desires the CSI feedback information and the base station triggers the CSI feedback through a downlink control channel such as the PDCCH/ePDCCH.

In the LTE system, when the CSI feedback is triggered, what information the UE should feed back is divided into a PUSCH CSI reporting mode as illustrated in FIG. 8 and in what PUSCH CSI reporting mode the UE should operate is known to the UE through a higher layer message in advance.

FIG. 8 is a diagram illustrating an example of a PUSCH CSI reporting mode.

The PUSCH CSI reporting mode is also defined for the periodic CSI feedback through the PUCCH.

FIG. 9 is a diagram illustrating an example of a PUCCH CSI reporting mode.

In the case of THE PUCCH, it is difficult to send the CSI information to be sent at a time because a data amount (payload size) which may be sent at a time is smaller than the data amount in the PUSCH.

Therefore, a time of transmitting the CQI and the PMI and a time of transmitting the RI are different according to each CSI reporting mode. For example, in reporting mode 1-0, only the RI is transmitted at a specific PUCCH transmission time and wideband CQI is transmitted at another PUCCH transmission time. A PUCCH reporting type is defined according to a type of CSI information configured at the specific PUCCH transmission time. For example, in the above example, a reporting type in which only the RI is transmitted corresponds to type 3 and a reporting type in which only the wideband CQI is transmitted corresponds to type 4. An RI feedback period and an offset value and a CQI/PMI feedback period and an offset value are configured in the UE through the higher layer message.

The CSI feedback information is included in uplink control information (UCI).

Reference Signals in LTE

The purpose of the pilot or reference signal (RS) in the LTE system may be largely divided into the followings.

1. Measurement RS: Pilot for measuring channel state

A. CSI measurement/reporting purpose (short term measurement): purposes including Link adaptation, rank adaptation, closed loop MIMO precoding, etc.

B. Long term measurement/reporting purpose: purposes including handover, cell selection/reselection, etc.

2. Demodulation RS: pilot for receiving physical channel

3. Positioning RS: pilot for estimating position of UE

4. MBSFN RS: pilot for multi-cast/broadcast service

In LTE Rel-8, cell-specific RS (CRS) is used for measurement (purpose 1A/B) and demodulation (purpose 2) for most downlink physical channels, but in order to solve an RS overhead problem depending on an increase in number of antennas, the CSI-RS is used exclusively for CSI measurement (purpose 1A) and the UE-specific RS is used exclusively for reception (purpose 2) of the downlink data channel (PDSCH) from LTE Advanced (Rel-10).

The CSI-RS as RS designed for CSI measurement and feedback only is characterized in that the CSI-RS has still lower RS overhead than the CRS and it is designed so that the CRS supports up to four multi-antenna ports, while the CSI-RS supports up to eight multi-antenna ports. The UE-specific RS is designed to be dedicated to demodulation of the data channel, and it is characterized in that the UE-specific RS is a precoded RS in which the MIMO precoding scheme applied when data is transmitted to the corresponding UE is applied to the pilot signal unlike the CRS.

Therefore, UE-specific RSs need not be transmitted as large as the number of antenna ports and may be transmitted only as large as the number (transmission rank) of transmission layers.

Further, since the UE-specific RS is transmitted for a purpose of receiving the data channel of the corresponding UE to a resource region which is the same a data channel resource region allocated to each UE through a scheduler of the base station, it is characterized in that the UE-specific RS is the UE-specific RS.

Since the CRS is continuously transmitted in the same pattern in a system bandwidth so as to be used for measurement and demodulation purposes by all UEs in the cell, the CRS is cell-specific.

In LTE uplink, a sounding RS (SRS) is designed as a measurement RS, and a demodulation RS (DMRS) for demodulation for the uplink data channel (PUSCH) and a DMRS for the uplink control channel (PUCCH) for ACK/NACK and CSI feedback are respectively designed.

Beam Management and Beam Recovery

The base station may request to the UE the periodic CSI report, the semi-persistent CSI report (periodic CSI reporting is activated only during a specific time interval or a plurality of consecutive CSI reports is performed), or the aperiodic CSI report.

Here, in the case of the periodic and semi-persistent (SP) CSI reporting, an uplink resource (e.g., PUCCH in LTE) for the CSI reporting at a specific period is allocated to during a period during which reporting is activated.

For CSI measurement of the UE, transmitting a downlink (DL) reference signal (RS) of the base station is required.

In the case of a beamformed system to which the (analog) beamforming is applied, determining a DL transmission (Tx)/reception (Rx) beam pair for the DL RS transmission/reception and a UL Tx/Rx beam pair for uplink control information (UCI) (e.g., CSI, ACK/NACK) transmission/reception are required.

A determination procedure of the DL beam pair may be configured by a combination of (1) a procedure in which the base station transmits DL RSs corresponding to a plurality of TRP Tx beams to the UE, (2) a TRP Tx beam selection procedure in which the UE selects and/or reports one of the DL RSs, (3) a procedure in which the base station repeatedly transmits the same RS signal corresponding to each TRP Tx beam, and (4) a procedure in which the UE measures the repeatedly transmitted signals with different UE Rx beams.

Further, a determination procedure of the UL beam pair may be configured by a combination of (1) a procedure in which the UE transmits UL RSs corresponding to a plurality of UE Tx beams to the base station, (2) a UE Tx beam selection procedure in which the base station selects and/or signals one of the UL RSs, (3) a procedure in which the UE repeatedly transmits the same RS signal corresponding to each UE Tx beam to the base station, and (4) a procedure in which the base station measures the repeatedly transmitted signals with different TRP Rx beams.

When DL/UL beam reciprocity (or beam correspondence) is established, that is, assuming that a base station DL Tx beam and a base station UL Rx beam match and the UE UL Tx beam and a UE DL Rx beam match in communication between the base station and the UE, when only any one of the DL beam pair and the UL beam pair is determined, a procedure of determining the other one may be omitted.

A process of determining the DL and/or UL beam pair may be performed periodically or aperiodically.

When the number of candidate beams is large, required RS overhead may be large, and as a result, it is not preferable that the process of determining the DL and/or UL beam pair frequently occurs.

It is assumed that after the process of determining the DL and/or UL beam pair is completed, the UE performs periodic or semi-persistent (SP) CSI reporting.

Here, the CSI-RS including a single or a plurality of antenna ports for CSI measurement of the UE may be beamformed to the TRP Tx beam determined as the DL beam and transmitted and a transmission period of the CSI-RS may be equal to or the CSI reporting period of the CSI or the CSI-RS may be more frequently transmitted than the CSI.

Alternatively, the UE may transmit the aperiodic CSI-RS in accordance with the CSI reporting period or more frequently.

The UE (e.g., UE) may periodically transmit the measured CSI information with the UL Tx beam predetermined in the UL beam pair determination process.

A beam mismatch problem may occur according to a period of beam management set in performing the DL/UL beam management process.

In particular, when the UE changes a position thereof, the UE rotates, or a radio channel environment is changed due to movement of a peripheral object of the UE (for example, when a line-of-sight (LoS) environment is changed to a non-LoS environment by blocking of the beam), an optimal DL/UL beam pair may be changed.

In the case of such a change, it may be generally said that a beam failure event occurs when tracking is unsuccessful by the beam management process performed by the network instruction.

The UE may determine whether the beam failure event occurs through a reception quality of the downlink RS and a reporting message for such a situation or a message (hereinafter, referred to as a 'beam recovery request message') for a beam recovery request should be delivered from the UE.

The beam recovery request message may be variously expressed as a beam failure recovery request message, a control signal, a control message, a first message, and the like.

The base station that receives the beam recovery request message from the UE may perform the beam recovery through various processes including beam RS transmission of the UE, a beam reporting request, and the like.

A series of beam recovery process described above will be expressed as a 'beam recovery'.

Standardization of a new communication system called New Radio or New Rat (NR) has been under way since LTE in 3GPP and the following contents related to the beam management are included.

(Content 1)

The NR supports that UE may trigger a mechanism to recover the beam failure.

The network explicitly configures resources for UL transmission of signals in the UE for recovery purpose.

Configurations of resources are supported where the base station is listening from all or partial directions (e.g., random access region).

(To be discussed later) Trigger condition of recovery signal (new or existing signal) related to UE operation of RS/control channel/data channel monitoring The transmission of the DL signal is supported, which permits the UE to monitor the beam to identify new potential beams.

(To be discussed later) transmission of a beam sweep control channel is not excluded.

The mechanism needs to consider a tradeoff between performance and DL signaling overhead.

(Content 2)

Considering possible candidate solutions below, beam management overhead and a delay time should be considered during CSI-RS design for NR beam management.

Opt1. IFDMA

Opt2. large subcarrier spacing

Other aspects considered during CSI-RS design for NR beam management include, for example, CSI-RS multiplexing, UE beam switch latency and UE implementation complexity (e.g., AGC training time), coverage of the CSI-RS, etc.

(Content 3)

The CSI-RS supports DL Tx beam sweeping and UE Rx beam sweeping.

The NR CSI-RS supports the following mapping structure.

An NP CSI-RS port may be mapped for each (sub) time unit.

Throughout the (sub) time unit, the same CSI-RS antenna ports may be mapped.

Here, "time unit" represents n OFDM symbols (n>=1) in configured/reference numerology.

Each time unit may be partitioned into sub-time units.

The mapping structure may be used to support multiple panels/Tx chain.

(Option 1)

The Tx beam(s) are the same across the sub-time units within each time unit.

The Tx beam(s) depends on the time unit.

(Option 2)

The Tx beam(s) are different per sub-time unit within each time unit.

The Tx beam(s) are the same in the time units.

(Option 3): Combination of option 1 and option 2.

The Tx beam(s) are the same in the sub-time units within one time unit.

The Tx beam(s) are different per sub-time unit within different time units.

Hereinafter, a beam failure recovery mechanism of the UE will be briefly described.

The beam failure recovery mechanism of the UE includes processes (1) to (4) below.

(1) The beam failure is detected.

(2) A new candidate beam is identified.

(3) The beam failure recovery request is transmitted.

(4) The UE monitors a response of the gNB to the beam failure recovery request.

First, referring to a beam failure detection process, the UE monitors a beam failure detection RS to evaluate whether a beam failure trigger condition is satisfied.

In addition, the beam failure detection RS at least includes a periodic CSI-RS for beam management. Here, a Synchronization Signal (SS) block may also be used for beam management.

Here, the SS block may be interpreted as the synchronization signal SS being transmitted in a slot unit or a specific time unit.

Here, the beam failure detection RS includes a case of measuring the detection/demodulation quality of an associated radio channel using the RS and a Quasi Co-Location (QCL) indicator as well as measuring the quality of the corresponding RS. For example, a CSI-RS indicated for (primary) PDCCH monitoring or an ID associated with the SS block may be appreciated as the beam failure detection RS and in this case, whether the beam failure event occurs may be defined as a case where detection/demodulation performance of the corresponding PDCCH is equal to or less than predetermined performance.

The beam failure event may occur when the quality of the beam pair link(s) of the associated control channel falls to a certain level or less.

Specifically, the quality of the beam pair link(s) of the associated control channel may be determined as PDCCH detection performance.

For example, while the UE monitors the PDCCH (or blind decoding), if the PDCCH detection performance is poor as a result of a CRC check, the UE may detect the beam failure.

Alternatively, when multiple PDCCHs are transmitted through multiple beams (or multiple PDCCHs are transmitted with different beams), it is possible to determine whether the beam failure event occurs with detection performance for a specific PDCCH (e.g., PDCCH associated with a serving beam).

Here, the multiple PDCCHs may be transmitted and/or received for different beams in different control channel regions (e.g., symbols, slots, subframes, etc.), respectively.

In this case, the control channel region for each beam may be predefined or transmitted/received via the higher layer signaling.

Further, when it is determined whether the beam failure event occurs due to the quality of the beam pair link(s) of the associated control channel, it may be determined whether the beam failure event occurs according to whether only the quality of the DL beam falls to a certain level or less, whether only the quality of the UL beam falls to a certain level or less, or whether both of the qualities of the DL beam and the UL beam fall to a certain level or less.

Here, the certain level or less may be a threshold or less, time-out of the associated timer, etc.

In addition, BRS, RS for fine timing/frequency tracking, SS blocks for fine timing/frequency tracking, DM-RS for the PDCCH, DM-RS for the PDSCH, etc. may be used as a signal for detecting the beam failure.

Next, referring to a new candidate beam identification process, the UE monitors a beam identification RS to find a new candidate beam.

The beam identification RS includes information on 1) the periodic CSI-RS for beam management when configured by NW, and 2) the periodic CSI-RS and SS block in the serving cell when the SS block is used for beam management.

Next, referring to the beam failure recovery request transmission process, the information carried by the beam failure recovery request includes at least one of 1) explicit/implicit information for identifying UE and new gNB TX beam information or 2) explicit/implicit information as to whether the UE is identified and there is a new candidate beam.

Further, in transmission of the beam failure recovery request, one of PRACH, PUCCH, and PRACH-like (e.g., different parameters for a preamble sequence from the PRACH).

A beam failure recovery request resource/signal may be used additionally in a scheduling request.

Next, the UE monitors a control channel search space to receive a gNB response to the beam failure recovery request.

In addition, the following triggering conditions are supported for the transmission of the beam failure recovery request.

Condition: Case where the beam failure is detected and the candidate beam is identified when only the CSI-RS is used for new candidate beam identification In addition, the following channels are supported for the transmission of the beam failure recovery request.

A resource that is orthogonal to at least another PRACH transmission's resource is used with respect to a non-contention-based channel, FDM, based on PRACH.

PUCCH for the transmission of the beam failure recovery request is supported.

As described above, in the case of the NR, two mechanisms may be all supported, which includes (1) a mechanism (first mechanism) in which a beam recovery request message is transmitted using the same symbols as PRACH and (2) a mechanism (second mechanism) in which the beam recovery request message is transmitted using symbols other than PRACH.

The first mechanism may be a useful mechanism when even uplink synchronization is lost due to the beam failure (when the beam quality is relatively low or there is no alternative beam) and/or when a predetermined PRACH resource is temporally close to a beam failure event occurrence time.

The second mechanism may be a useful mechanism in a situation of the beam failure or when the uplink synchronization is not lost (when the beam quality is relatively low or there is the alternative beam) and/or when the predetermined PRACH resource is temporally distant from the beam failure event occurrence time.

Further, when the UE transmits the beam recovery request message to the base station a predetermined number of times and thereafter, dos not receive a response to the request from the base station in the beam failure, the UE performs a radio link failure (RLF) operation.

When the beam failure occurs due to movement of the UE, a method for recovery the beam will be described.

In particular, in this specification, the method for recovering the beam may be performed differently according to whether there is the alternative beam and detailed contents will be described below.

A beam reference signal (RS) (BRS) used in this specification is a downlink physical signal used for beam management and the CSI-RS, mobility RS (MRS), a synchronization signal, etc. may be used as the beam BS.

The Beam RS may be configured (as an RRC layer message) by resource setting on a beam management framework (or CSI framework). That is, the beam RS may be preconfigured by the resource setting.

As will be described later, the beam management framework is a structure that indicates a correlation between beam reporting setting(s), beam resource setting(s), beam resource set, and measurement setting(s). A more detailed description related thereto will be given later.

Further, beam reporting used in this specification may mean feedback information of the UE related to the beam and may include beam quality related information and/or beam indication information.

In this specification, the expression of 'A and/or B', 'A and/or B', and A/B' may be construed as the same meaning as 'including at least one of A or B'.

The beam quality related information may be Channel Quality Information (CQI), Layer 3 Reference Signals Received Power (RSRP), Layer 1 RSRP, etc.

The beam indication information may be a CSI-RS resource indicator (CRI), a Precoding Matrix Indicator (PMI), an RS port index, etc.

The feedback information, parameters, reporting period, frequency granularity (e.g., wideband feedback, subband feedback), etc., related to the beam may be configured as (RRC layer message) by reporting setting on the beam management framework (or CSI framework).

That is, the feedback information, the reporting period, the frequency granularity, etc., related to the beam may be preconfigured by the reporting setting.

When the UE transmits the beam recovery request to the network (e.g., base station), the network may take two operations (method 1 and method 2) as follows.

(Method 1)

Method 1 shows a network operation in the absence of the alternative beam (e.g., alternative DL beam pair).

That is, method 1 is a method for transmitting a (aperiodic) Beam RS to the UE (or triggering the beam RS) and transmitting a (aperiodic) Beam reporting trigger to the UE when the network receives the beam recovery request from the UE.

The alternative beam may be appreciated as an RS set which the base station configures for periodic beam management or monitoring and may be equal to or less than the set of the beam measurable by the UE.

That is, the alternative beam may be RS(s) having a specific quality or more among the RSs configured for the purpose of beam management.

For example, the network may configure N CSI-RS resources for periodic beam management or monitoring to the UE.

However, the UE may measure the signal quality from M beamformed SS blocks (with wider coverage) as well as M CSI-RS resources. Therefore, a UE does not have the alternative beam among N configured CSI-RSs, but may have the alternative beam, that is, a signal having a specific quality or more among M SS blocks. However, in this case, the SS block is cell-specific and has periodic properties, so the SS block is not suitable to be included in the above-described aperiodic Beam RS category which needs to be UE-specifically transmitted on-demand. Therefore, this case may be regarded as a category of method 1, which requires a subsequent process of transmitting a Beam RS (e.g., CSI-RS) to the UE, even if there is an alternative SS block beam.

FIG. 10 illustrates an example of a network operation depending on whether there is an alternative beam.

Specifically, FIG. 10a is a diagram illustrating method 1.

Here, the Beam RS trigger and the Beam reporting trigger may be independently signaled or jointly signaled.

As an example, the network may trigger Beam RS and Beam reporting together using one DCI.

Referring to FIG. 10a, the network transmits the periodic Beam RS to the UE through the DL.

Thereafter, when the network receives the beam recovery request from the UE, the network triggers the (aperiodic) Beam RS and the (aperiodic) beam reporting to the UE together (according to method 1).

Accordingly, the UE performs beam measurement through a reference resource and reports the beam measurement result to the network.

A specific method for determining the reference resource will be described later.

(Method 2)

Method 2 shows a network operation in the presence of an alternative DL beam pair.

That is, in method 2, when the network receives the beam recovery request from the UE, the network performs the (aperiodic) beam reporting trigger as illustrated in FIG. 10b.

FIG. 10b is a diagram illustrating method 2.

Referring to FIG. 10b, the network transmits the periodic Beam RS to the UE through the DL.

Thereafter, when the network receives the beam recovery request from the UE, the network triggers the (aperiodic) Beam reporting to the UE.

Here, unlike method 1, in method 2, since the UE knows the alternative DL beam pair, the network does not (or does not trigger) the aperiodic Beam RS to the UE.

Accordingly, the UE performs beam measurement through the reference resource and reports the beam measurement result to the network.

Here, a preferred Tx beam indicator and a beam quality metric may be transmitted together in the beam reporting process. A detailed description thereof will be described below.

As described above, method 2 is a useful scheme since beam RS transmission of the network and beam RS reception of the UE may be omitted when the UE knows information on the DL Tx beam (or DL beam pair) which may be replaced from a channel measured through a predetermined RS.

In contrast, method 1, which is previously described, is a useful method when there is no alternative beam or when the base station may not know the information on the presence or absence of the alternative beam.

Further, for method 1 and method 2, the (Beam) reporting setting may not be distinguished.

That is, in method 1 and method 2, beam reporting may constitute the same feedback information, have the same time domain behavior (e.g., aperiodic reporting) of the UE, and have the same frequency-side granularity.

The same feedback information may include, for example, a preferred DL Tx beam indicator(s) and a beam quality metric(s).

The preferred DL Tx beam indicator may be, for example, beam ID, CSI-RS Resource Indicator (CRI), RS port index, etc.

The beam quality metric may be, for example, L1 RSRP, CQI, etc.

In the beam recovery method, the network may support at least one of the following configuration schemes to the UE through RRC signaling.

FIG. 11 is a diagram illustrating an example of a beam related configuration method.

(Setting Method 1)

Referring to FIG. 11a, the reporting setting may include one aperiodic CSI/beam reporting setting and the resource setting may include one aperiodic beam RS setting (e.g., CSI-RS) and one periodic/semi-persistent beam RS setting.

Here, a plurality of reporting settings may be expressed as reporting settings and the like and a plurality of resource settings may be expressed as resource settings and the like.

Further, the resource setting may include one or more resource sets.

Referring to FIG. 11a, it can be seen that one reporting setting and two resource settings are connected by a link (or channel) in a measurement setting.

(Setting Method 2)

Referring to FIG. 11b, the reporting setting includes one aperiodic CSI/beam reporting setting, the resource setting includes one beam RS setting, and the beam RS setting includes at least two resource sets as described above.

Resource set with aperiodic beam RS(s) (e.g., CSI-RS)

Resource set with periodic/semi-persistent beam RS(s) (e.g., CSI-RS)

In addition, the two settings (reporting setting and resource setting) are connected by one link (or channel) in the measurement setting.

As described above, setting method 1 is useful when a time-domain behavior (aperiodic, semi-persistent (SP), periodic) is commonly configured per resource setting.

In addition, setting method 2 may be useful when the time-domain behavior is commonly configured per resource set within the resource setting.

Next, a method is described in detail, which informs the network (or base station) of information indicating which method of method 1 and method 2 is preferred or information on the presence or absence of the alternative beam (or the presence or absence of a measurement value) from a premeasured RS.

Information on which method is preferred or information on the presence or absence of the alternative beam which the UE transmits to the network will be expressed below as 'control information'.

Here, the control information may be included in a beam recovery request signal or a beam failure reporting signal.

The control information may be an indicator or indication information that directly indicates the presence or absence of the alternative beam, preferred link information associated with the pre-configured aperiodic beam reporting setting (in the case of setting method 1), preferred resource setting information (in the case of setting method 1), or preferred resource set information (in the case of setting method 2).

The control information may be delivered to the network as physical layer control information, such as Uplink Control Information (UCI) in the LTE system or may be delivered in a higher layer message format (e.g., MAC CE).

In particular, the UE may transmit the control information using the same resource (e.g., symbol(s)) as the PRACH.

When the UE uses (or transmits) a signal Code Division Multiplexed (CDM) or Frequency Division Multiplexed (FDM) with the PRACH as the beam recovery request signal, a sequence set used in the PRACH may be separately used according to the presence or absence of the alternative beam.

For example, when the sequence set used in the PRACH is separately used, a separated root index(es) or cyclic shift values may be used.

Alternatively, when the UE uses the signal Code Division Multiplexed (CDM) or Frequency Division Multiplexed (FDM) with the PRACH as the beam recovery request signal, a sequence set which is the same as the sequence set used in the PRACH may be used. However, in this case, whether the signal is the PRACH or the beam recovery request signal may be discriminated by applying different time-domain/frequency-domain Orthogonal Cover Codes (OCCs).

When the network (or the base station) instructs the UE to perform aperiodic reporting triggering with a control element (MAC), which is the higher layer message and/or downlink control information (DCI) which is the physical layer message, at least one of information (1) to (4) below may be included.

(1) Information on a valid/invalid Link within the pre-associated settings (in the case of setting method 1)

The UE determines as the reference resource only the RS included in the resource setting indicated by the valid link (or not indicated by the invalid link) among a plurality of pre-associated resource settings as the measurement setting and performs beam measurement and beam reporting for the beam measurement.

(2) Information on a Valid/invalid Resource setting within the pre-associated settings (in the case of setting method 2)

The UE determines as the reference resource only the RS included in the valid resource setting (or not included in the invalid resource setting) among the plurality of resource settings pre-associated as the measurement setting and performs the beam measurement and the beam reporting.

(3) Information ON a valid/invalid resource set in the pre-associated resource setting (in the case of setting method 2)

The UE determines as the reference resource only the RS included in the valid resource set within the resource setting pre-associated as the measurement setting and performs the beam measurement and the beam reporting.

(4) Reporting type/mode setting information (applied to both setting method 1 and setting method 2)

The reporting type/mode setting information indicates an indicator or indication information indicating whether triggering of the aperiodic resource and triggering of the aperiodic report are indicated together or only the aperiodic report triggering is indicated.

The reporting type or mode when the triggering of the aperiodic resource and the triggering of the aperiodic report are indicated together may be expressed as a joint triggering mode or a first mode and the reporting type or mode when only the aperiodic report triggering is indicated may be expressed as a reporting triggering only mode or a second mode.

In the case of the joint triggering mode (or first mode), the UE determines as the reference resource only the aperiodic resource setting/resource set between a resource setting (setting method 1) or a resource set (setting method 2) configured as the RRC and performs the beam measurement and the beam reporting.

That is, the UE ignores the periodic resource/semi-stationary resource connected to the aperiodic reporting.

In addition, in the case of Reporting triggering only mode (or second mode), the UE determines as the reference resource only the periodic or semi-persistent resource setting/resource set between the resource setting (setting method 2) or the resource set (setting method 2) configured as the RRC and performs the beam measurement and the beam reporting.

That is, the UE ignores the aperiodic resource connected to the aperiodic reporting.

In addition, when the UE reports information on which of methods 1 and 2 is preferred by the UE or information on the presence or absence of the alternative beam (or the presence or absence of a measured value) from a pre-measured RS, the base station may transmit to the UE information (confirmation message or ACK/NACK) indicating whether to apply report information of the UE.

When the report information of the mobile station is transmitted to the base station before indicating the aperiodic reporting triggering of the base station, the information indicating whether to the report information of the UE may be transmitted together information (1) to (4) described above when indicating the aperiodic reporting triggering.

When the UE transmits the information on which of methods 1 and 2 is preferred by the UE or the information on the presence or absence of the alternative beam (or the presence or absence of a measured value) from the pre-measured RS, the base station may transmit to the UE information for confirming reception and application of the corresponding information.

For example, when the base station transmits the confirmed (or ACK) message to the UE, the transmission of the confirmed message indicates that the base station confirms that the information transmitted by the UE is to be applied by the base station.

Alternatively, when the base station does not transmit the confirmed message or transmits a not-confirmed (or NACK) message to the UE, the base station may request the UE to additionally retransmit some information of information (1) to (4) described above or allow the UE to retransmit the information on which of methods 1 and 2 is preferred by the UE or the information on the presence or absence of the alternative beam (or the presence or absence of the measured value).

As described above, the information on which of methods 1 and 2 is preferred by the UE or the information on the presence or absence of the alternative beam (or the presence or absence of the measured value) may be simply referred to as 'control information'.

Further, information (1) to (4) described above may be omitted when the information on which of methods 1 and 2 is preferred by the UE or the information on the presence or absence of the alternative beam (or the presence or absence of the measured value) is first reported to the base station.

Next, a method for deciding (or determining) the reference resource for the beam measurement and the beam reporting will be described.

The UE explicitly or implicitly reports to the base station (i) information indicating there is the measurement value for the alternative beam (or method 2 is preferred) in the beam recovery request signal (or beam failure reporting signal).

Thereafter, when the UE receives an aperiodic beam reporting triggering instruction from the base station (within a specific time or before a specific timer expires), the UE may determine as the reference resource a resource (e.g., periodic RS, activated semi-persistent RS, or pre-triggered aperiodic RS) which may be activated (or triggered or configured) and measured before a slot in which the reporting triggering message is received among resources (RSs) included in the resource setting (setting method 1)/the resource set (setting method 2) associated with the aperiodic beam reporting and perform the beam measurement and the beam reporting.

That is, the reference resource is determined as a specific resource activated before the slot in which the reporting triggering message is received.

Contents thereof will be described with reference to FIG. 10b for describing method 2.

As another example, the UE explicitly or implicitly reports to the base station (ii) information indicating that there is no measurement value for the alternative beam (or method 1 is preferred) in the beam recovery request signal (or beam failure reporting signal).

Thereafter, when the UE receives an aperiodic beam reporting triggering instruction from the base station (within a specific time or before a specific timer expires), the UE may determine as the reference resource a resource (e.g., triggered/activated aperiodic RS in later slot(s)) to be activated (or triggered or configured) in a slot which is the same as the slot in which the reporting triggering message is received or at a time after the slot among resources (RSs) included in the resource setting (setting method 1)/the resource set (setting method 2) associated with the aperiodic beam reporting and perform the beam measurement and the beam reporting. Contents thereof will be described with reference to FIG. 10a for describing method 1.

That is, the reference resource is determined as a specific resource to be activated in the same which is the same as the slot in which the reporting triggering message is received or a slot after the slot in which the reporting triggering message is received.

FIG. 12 is a flowchart illustrating an example of a method for performing a beam recovery.

First, the UE receives a beam reference signal (BRS) used for beam management from the base station (S1210).

Thereafter, when a beam failure event is detected, the UE transmits a control signal for a beam failure recovery request to the base station (step S1220).

The beam failure event may be detected based on the received beam reference signal.

The control signal includes indication information indicating whether an alternative beam exists.

As described above, the alternative beam may refer to a reference signal having a channel quality higher than a specific channel quality among the reference signals configured for the beam management.

Thereafter, when beam reporting is triggered, the UE reports a beam measurement result to the base station in a specific resource (S1230).

The control signal may use the same time resource as a Physical Random Access Channel (PRACH).

In this case, the control signal may be Code Division Multiplexed (CDM) or Frequency Division Multiplexed (FDM) in the PRACH and the time resource.

The control signal may be transmitted through a Physical Uplink Control Channel (PUCCH).

The control signal may use different time and/or frequency resources, different sequence sets, and/or different Uplink Control Information (UCI) depending on the absence or absence of the alternative beam.

In this case, the different sequence sets may be distinguished by a root sequence index or a cyclic shift value.

Further, the indication information may be information on a preferred link associated with a predetermined non-periodic beam reporting setting, information on a preferred resource setting associated with the predetermined aperiodic beam reporting setting, or information on a preferred resource set associated with the predetermined aperiodic beam reporting setting.

Additionally, the UE may receive an indication message indicating triggering of the beam reporting from the base station.

Here, the beam reporting may be triggered based on the indication message.

The indication message may include at least one of information associated with a valid or invalid link in settings pre-associated with a measurement setting, information associated with a valid or invalid resource setting in the settings pre-associated with the measurement setting, information associated with a valid or invalid resource set in the settings pre-associated with the measurement setting, or beam reporting mode setting information.

In the measurement setting, one reporting setting and each of two resource settings may be connected by a link or one reporting setting and one resource setting may be connected by the link.

The beam reporting mode setting information may indicate a first mode in which transmission of an aperiodic beam reference signal and aperiodic beam reporting are triggered together or a second mode in which only the aperiodic beam reporting is triggered.

The first mode represents the joint triggering mode described above and the second mode represents the reporting triggering only mode described above.

When the beam reporting mode setting information is set to the first mode, the specific resource may be the aperiodic resource setting or the aperiodic resource set in the resource setting or the resource configured by radio resource control (RRC).

In this case, the specific resource may be a resource activated so that beam measurement is enabled in a slot which is the same as a slot in which the indication message is received or after the slot in which the indication message is received.

Alternatively, when the beam reporting mode setting information is set to the second mode, the specific resource may be a periodic resource setting or semi-persistent resource setting or resource set configured by the RRC the aperiodic resource set in the resource setting or the resource set by radio resource control (RRC).

In this case, the specific resource may be a resource activated to enable the beam measurement before the slot in which the instruction message is received.

Additionally, the UE may receive a response to the report from the base station.

When the response is NACK, the UE may retransmit information including at least one of the indication information or information included in the indication message to the base station.

Hereinafter, a method for performing all or some of beam reporting information simultaneously together with beam failure reporting differentially according to a type of UL resource and/or a configuration of the UL resource performing a beam recovery request will be described.

The beam recovery request may be expressed as the beam failure reporting.

The beam reporting information may be, for example, a preferred DL Tx beam indicator(s), a beam quality metric(s) (e.g., L1 RSRP, CQI), etc.

The preferred DL Tx beam indicator(s) may be, for example, a beam ID, a CSI-RS Resource Indicator (CRI), an RS port index, a synchronization signal block (SSB) index, a PBCH DMRS index, etc.

The beam quality metric(s) may be, for example, L1 RSRP, CQI, etc.

When all of the beam reporting information is reported, the aperiodic beam reporting triggering process of the base station and the subsequent beam reporting process of the UE may be omitted in setting method 2 (Method 2) described above and this may be defined as 'setting method 3'.

In addition, the method for reporting some of the beam reporting information includes a method for reporting only some information and a method for transmitting coarse information (or information of lower granularity).

For example, the L1 RSRP that is transmitted with the beam failure reporting may be configured to include (or allocate) fewer bits than L1 RSRP transmitted through the subsequent beam reporting process and have a lower quantization level.

Alternatively, the base station may cause the UE to calculate and report a difference value from a reporting value when (the beam failure) is reported at a previous time (beam failure) and reduce the amount of (beam failure) reporting information.

For example, the UE may transmit a differential CQI and differential RSRP together with the beam failure reporting.

As described above, as a resource for transmitting the beam recovery request (BRR) in the NR system, a UL resource (hereinafter, referred to as 'UL type I') which is Code Division Multiplexed (CDM) or Frequency Division Multiplexed (FDM) with the PRACH to share the time resource with the PRACH and a UL resource (hereinafter, referred to as 'UL type II') which uses a different time resource from the PRACH may be both used.

The UL type I may be configured in a slot type/configuration (e.g., UL slot, UL dominant slot) having a relatively large number of UL resources similarly to the PRACH and the UL type II may be configured in a slot having a small number of UL resources like the PUCCH.

The UL type I may be separately configured PRACH preambles for the purpose of the beam recovery request (or beam failure reporting request).

That is, the PRACH may be used for the beam recovery request and the PRACH may be a contention-free (or non-contention) based PRACH or a contention based PRACH.

Here, the contention-free based PRACH resource(s) may be FDM or CDM with other contention-free based PRACH resource(s) (using the same time or frequency resource but different sequence).

For example, the UL type I may be PRACH preambles configured for the purpose of a beam failure reporting request (BFRQ) and the UL type II may be short/long PUCCH resources.

Then, the UE may report the beam quality (L1-RSRP) only when transmitting the BFRQ using the UL type II.

In the NR system, the PUCCH is divided into two types (short PUCCH or long PUCCH).

The Short PUCCH may be constituted by one or two symbols, and may be located at the end of the slot, and may transmit uplink control information (UNC) of up to several tens of bits.

In addition, the long PUCCH is may be constituted by 4 to 12 symbols (or 14 symbols) and may transmit a UCI of several hundreds of bits at most.

The UL type II may be transmitted through a PUSCH, a short/long PUCCH, or a separately defined uplink channel.

However, considering a link adaptation problem, a UL resource allocation problem, etc. in the beam failure situation, it is preferable that the UL type II is transmitted using the short PUCCH and/or the long PUCCH.

The expression of 'A and/or B' used in this specification may be construed as the same meaning as 'including at least one of A or B'.

Since the UL type I uses the same time resource as the PRACH, the base station may assume to apply Rx beam sweeping (in all directions) in order to receive the corresponding signal (beam recovery request signal).

Therefore, it is advantageous that the beam restoration request signal is designed so as to have a structure in which a small amount of information is repeatedly transmitted, because a signal is received with good quality only in a time/frequency resource corresponding to a specific beam.

Therefore, it may be preferable that the UL type I is configured not to include the additional beam reporting information (the preferred DL transmission beam indicator, beam quality metric) or to include only the beam reporting information that is configured in a smaller number of bits than the UL type II.

In addition, in the case of the UL type I, setting method 3 (of method 2) is not supported.

Even in the case of the UL type II, a mechanism supported according to a PUCCH type (short PUCCH or long PUCCH) and a PUCCH resource size (the number of symbols and/or PRB size) may be defined or configured differentially.

For example, in the beam information that may be transmitted through the long PUCCH, the corresponding L1 RSRP as well as the RS indicator for beam identification may be transmitted, but in the beam information which may be transmitted through the short PUCCH, the L1 RSRP may be omitted.

Alternatively, the short PUCCH may be designed or defined such that the additional beam reporting information is not included.

In addition, the supported beam report information may be designed differentially according to (a range of) the number of short/long PUCCH symbols.

Further, the short PUCCH may be undesirable to be semi-statically allocated (or configured) by the RRC because the short PUCCH is primarily designed for the purpose of fast ACK/NACK.

Therefore, it may more preferable that the UL type II is transmitted only in the long PUCCH.

In the foregoing description, it is assumed that the UL type I and the UL type II are differentially (or respectively) designed or defined, but may also be integrally designed.

Hereinafter, a method for integrally designing the UL type I and the UL type II will be described.

The base station may configure separate (multiple) UL resources by the RRC according to characteristics and an information amount of information which may be transmitted together with the beam failure reporting.

In this case, a specific UL resource configured to a period 'N' (N is a natural number) may be CDM or FDM with the PRACH resource at a period of N times an integer multiple and may be TDM with the PRACH resource at the remaining points of time.

Here, an information configuration transmitted in the corresponding resource may be configured identically regardless of a reporting point of time.

Method for Transmitting Information on Presence or Absence of Alternative Beam

Feedback information of an implicit/explicit indication of the presence or absence of the alternative beam may also be included in the beam reporting information differentially according to the type and/or configuration of the UL resource or may be transmitted together with the beam recovery request.

For example, in the case of the UL type I, since the base station will receive a signal in all directions and may support only a small feedback payload, the base station may receive reporting for the presence or absence of the alternative beam together with the beam recovery request from the UE (supporting setting method 1 and/or setting method 2).

In addition, in case of the UL type II, since the base station will receive the signal in a specific direction, the alternative beam presence/absence information is defined to be used only when there is the alternative beam, so that the alternative beam presence/absence information are not transmitted together with the beam recovery request and the base station may allow the UE to report the alternative beam presence/absence information including information (and beam quality information) for beam identification (supporting setting method 2 and/or setting method 3).

The identification information may be delivered in an implicit manner.

In this case, the base station may implicitly acquire DL beam information for the corresponding UE according to UL resource information in which the UE transmits the signal when a UL resource corresponding to a DL resource is configured (for a UE in which channel reciprocity is established (or beam correspondence is established)) (for example, in a manner in which a UE having an excellent quality of a DL RS resource x transmits the signal by using a UL resource y).

That is, in a situation where a plurality of UL resources (e.g., UL type I or UL type II) corresponding to each of a plurality of DL resources (e.g., synchronization signal block, PBCH DMRS resource, and CSI-RS resource) are mapped and configured, the UE transmits the signal by selecting one or multiple UL resources, and as a result, the base station may implicitly identify whether a DL Tx beam corresponding to a predetermined DL resource has the excellent quality (as the alternative beam).

FIGS. 13 and 14 are flowcharts illustrating an example of an operation of a UE performing a beam recovery.

A part of FIG. 14 which is the same as that of FIG. 13 will be described with reference to FIG. 13 and only differences will be shown and described separately.

First, the UE receives the beam reference signal (BRS) used for beam management from the base station (S1310).

Thereafter, when the beam failure event is detected, the UE decides an uplink (UL) resource for transmitting the control signal associated with the beam failure recovery request (step S1320).

Here, the UL resource may be a Type 1 resource using the same time resource as the Physical Random Access Channel (PRACH) or a Type 2 resource using a different time resource from the PRACH.

Further, the Type 1 resource may be Frequency Division Multiplexed (FDM) and/or Code Division Multiplexed (CDM) with the PRACH.

In addition, the Type 2 resource may be a physical uplink control channel (PUCCH) resource or a physical uplink shared channel (PUSCH) resource.

When the Type 2 resource is the PUCCH resource, the PUCCH resource may be at least one of the short PUCCH or the long PUCCH.

Thereafter, the UE transmits the control signal to the base station in the decided UL resource (S1330).

Here, the control signal may include some or all of the information associated with the beam reporting or may not include information associated with the beam reporting.

When the UL resource is type 1 resource, the control signal may include only some of the information associated with the beam reporting and the information associated with the beam reporting may include the information on the presence or absence of the alternative beam.

The alternative beam may refer to a reference signal having a channel quality higher than a specific channel quality among the reference signals configured for the beam management.

When the UL resource is the Type 2 resource, the control signal may include all of the information associated with the beam reporting.

In this case, the information associated with the beam reporting may include at least one of beam identification information for beam identification or beam quality information indicating a beam quality.

Additionally, when the control signal includes some of the information associated with the beam reporting, the UE reports a beam measurement result to the base station in a specific resource (S1440). Here, the reporting of the beam measurement result may be performed when the beam reporting is triggered.

Steps S1410 to S1430 in FIG. 14 are the same as steps S1310 to S1330 in FIG. 13.

FIG. 15 is a flowchart illustrating an example of a beam failure recovery procedure.

The BFR procedure may include (1) a beam failure detection step (S1510), (2) a new beam identification step (S1520), (3) a beam failure recovery request step (S1530), and (4) a step of monitoring the response to the BFRQ from the base station (S1540).

Here, in step S1530, that is, for the BFRQ transmission, the PRACH preamble or the PUCCH may be used.

Step S1510, that is, beam failure detection will be described in more detail.

When block error rates (BLER) of all serving beams are equal to or more than a threshold, the case is called a beam failure instance.

RSs (qo) to be monitored by the UE are explicitly configured by the RRC or implicitly decided by the beam RS for the control channel.

An indication of the beam failure instance as the higher layer is periodic and an indication interval is decided by lowest periods of beam failure detection (BFD) RSs.

When the evaluation is lower than the beam failure instance BLER threshold, the indication to the higher layer is not performed.

A beam failure is declared when N consecutive beam failure instances occur.

Here, N is a NrofBeamFailureInstance parameter set by the RRC.

1-port CSI-RS and SSB are supported for BFD RS set.

Next, step S1520, that is, a new beam indication will be described.

The network (NW) may configure one or more PRACH resources/sequences to the UE.

The PRACH sequence is mapped to at least one new candidate beam.

The UE selects a new beam among the candidate beams in which the L1-RSRP is equal to or more than a threshold set by the RRC and transmits the PRACH through the selected beam. In this case, which beam is selected by the UE may be a UE implementation issue.

Next, steps S1530 and S1530, that is, the BFRQ transmission and the monitoring of the response to the BFRQ will be described.

The UE may configure a dedicated CORESET by the RRC to monitor a time duration of a window and the response of the base station to the BFRQ.

The UE starts monitoring after 4 slots of the PRACH transmission.

The UE assumes that the dedicated CORESET is spatially QCL with the DL RS of the UE-identified candidate beam in the beam failure recovery request.

When the timer expires or the number of PRACH transmissions reaches a maximum number, the UE stops the BFR procedure.

Here, the maximum number of PRACH transmissions and the timer are set by the RRC.

Hereinafter, an SS block (SSB) indication and the beam failure recovery will be described.

For rate matching purposes for at least the serving cell, for 6 GHz or less, an entire bitmap (8 bits) is used for the indication of actual SS/PBCH block transmission.

UE-specific RRC signaling with the entire bitmap may be used to indicate the SS blocks actually transmitted for both a 6 GHz or less (sub-6 GHz) case and a 6 GHz or more (over-6 GHz) case.

The actually transmitted SS blocks are indicated in remaining minimum system information (RMSI) for both the 6 GHz or less (sub-6 GHz) case and the 6 GHz or more (over-6 GHz) case.

The indication is compressed at 6 GHz or higher and an indication method is selected from the following alternatives.

(Alternative 1): Group-Bitmap and Intra-Group Bitmap

The group is defined as consecutive SS/PBCH blocks.

The intra-group bitmap may indicate which SS/PBCH block is actually transmitted in the group, each group may have the same transmission pattern of the SS/PBCH block, and the group-bitmap may indicate which group is actually transmitted.

For example, [8]+[8] bits for 8 groups and 8 SS/PBCH blocks per group.

(Alternative 2): Number of SS/PBCH Blocks Actually Transmitted in Group-Bitmap and Group (Fixed Start Index of SS/PBCH Block)

The group is defined as consecutive SS/PBCH blocks.

The group-bitmap indicates which group is actually transmitted and whether the SS/PBCH blocks in the group are logically consecutive and the number of actually transmitted SS/PBCH blocks indicates how many logically consecutive SS/PBCH blocks are actually transmitted starting from a first index, and the corresponding number is commonly applied to all transmitted groups.

For example, [8]+[3] bits for 8 groups and 8 SS/PBCH blocks per group.

(Alternative 3): The Intra-Group Bitmap and the Number of Actually Transmitted Groups (the Fixed Start Index of the Group)

The group is defined as consecutive SS/PBCH blocks.

The intra-group bitmap may indicate which SS/PBCH block is actually transmitted within the group, each group may have the same pattern as SS/PBCH block transmission, and the number of actually transmitted groups indicates how many consecutive groups are actually transmitted starting from a first group.

For example, [8]+[3] bits for 8 groups and 8 SS/PBCH blocks per group.

(Alternative 4): Group-Bitmap and the Number of SS/PBCH Blocks Actually Transmitted in Each Group The group is defined as consecutive SS/PBCH blocks.

The group-bitmap may indicate which group is actually transmitted and whether the SS/PBCH blocks in the group are logically consecutive and the number of SS/PBCH blocks actually transmitted for each group indicates how many logically consecutive SS/PBCH blocks are actually transmitted starting from the first index.

Minimum of [8]+[3] bits and [8]+[3]*[8] bits for 8 groups and 8 SS/PBCH blocks per group.

(Alternative 5): The number of SS/PBCH blocks actually transmitted, a starting index, and a gap between two consecutive SS/PBCH blocks are [6]+[6]+[6] bits.

(Alternative 6): Group-Bitmap

The group is defined as consecutive SS/PBCH blocks.

The group-bitmap may indicate which group is actually transmitted and whether all SS/PBCH blocks in the group being transmitted are actually transmitted.

For example, [8] bits for 8 groups and 8 SS/PBCH blocks per group.

Indicated resources are reserved for the actually transmitted SS blocks.

Data channels are rate-matched around the actually transmitted SS blocks.

Next, the contents associated with the beam failure recovery will be described.

The beam failure is declared only when all serving control channels fail.

In addition to the periodic CSI-RS, the SS block in the serving cell may be used for new candidate beam identification.

The following options may be configured for new candidate beam identification.

CSI-RS Resources Only

In this case, SSB is not configured for the new candidate beam identification.

SS Block Resources Only

In this case, CSI-RS is not configured for the new candidate beam identification.

Both SS Block Resources and CSI-RS Resources

For beam failure recovery request transmission on the contention-free physical random access channel (PRACH), using separate PRACH resources that are code division multiplexed (CDM) or frequency division multiplexed (FDM) with other PRACH resources is supported. That is, the base station may configure separate contention-free PRACH resources for BFR purposes, and when the UE transmits the corresponding PRACH resource and the base station receives the PRACH resource, the corresponding UE may implicitly determine that the corresponding UE is in a beam failure state.

Here, CDM means the same sequence design as the PRACH preamble.

The PRACH preambles for the beam fail recovery request transmission are selected from the preambles for the contention-free PRACH operation of Rel-15.

Next, the usages and configurations of the SS blocks for beam failure recovery will be described.

A reference signal (RS) used below may refer to a radio signal such as a synchronization signal (SS), an SS block, a physical channel, etc.

In addition, 'configuration' used in this specification may be interpreted as the same meaning as 'indication' or 'designation'.

Further, the SS block used in this specification may be interpreted as the same meaning as the SS/PBCH block and the SSB.

The SS block as well as the CSI-RS may be used to identify the new candidate beam.

From the viewpoint of a DL RS configuration, the DL RSs which the UE searches for the new candidate beam, i.e., a beam having a better quality than a current serving DL RS may be explicitly configured by the network.

When a certain DL RS quality is particularly better for UEs with beam correspondence, another required DL RS configuration indicates which UL resource may be used. Alternatively, in spite of a UE in which correspondence between a transmission beam and a reception beam is not normally made (a non-beam correspondence (UE), when the UE uses a certain uplink beam through the uplink beam management process, the base station may determine which reception beam is to be optimal in advance.

Therefore, when a specific downlink beam is good or bad, if it is determined with which uplink beam the PRACH is to be transmitted between the base station and the UE, the base station has no problem in receiving the PRACH and determining which downlink beam of the corresponding UE is good or bad at the time of receiving the corresponding PRACH.

In the case of the beam failure, the UE may be configured with multiple beam failure recovery request resources (BFRs).

Here, the BFR refers to a UL resource FDMed, CDMed, or TDMed with the PRACH for use in the beam failure recovery request.

For UEs with beam correspondence, each BFR may be associated with the DL beam(s) similar to the PRACH.

The reason is that the PRACH resource may be associated with the SS block or the CSI-RS.

Alternatively, as described above, each BFR may be associated with the DL beam(s) even with respect to the non-beam correspondence UE.

It is very natural to support the RRC configuration for association of each BFR and SS block or the CSI-RS.

As a result, the following two DL RS configurations may be required for beam recovery.

DL RS set configuration 1. List of new candidate DL RS beam list to be found by the UE when the serving beam fails DL RS set configuration 2. List as to which BFR is to be used when a specific candidate DL RS beam is good (associated DL RS resource information in each BFR)

Hereinafter, the beam failure recovery methods proposed in this specification will be described in more detail.

(Proposal 1)

In Proposal 1, for the UE having beam correspondence, the UE may be configured with multiple BFRs by radio resource control (RRC). Here, each BFR may be associated with the SS block or CSI-RS.

As described above, the beam failure recovery request resource (BFR) may refer to a resource which FDMed, CDMed, or TDMed with the PRACH to be used for the beam failure recovery request.

The BFR may be the PRACH preamble.

Here, the PRACH preamble may be the contention-free PRACH preamble.

In the DL RS indication for the BFR (corresponding to DL RS set configuration 2), it may be characterized in that one SS block is indicated when the DL RS connected to (or corresponding to) the one BFR is the SS block or one or more CSI-RS resource(s) are indicated when the DLRS is the CSI-RS. That is, only one SSB may be connected to one BFR and one or a plurality of CSI-RS resources may be connected.

More specifically, a fact that one SSB is associated (or connected) to one BFR may mean that the same RA preamble is not mapped to different SSBs.

This may be expressed as a fact that "UE is not expected to be configured with a duplicated ra-PreambleIndex for different BFR-SSB-Resources)."

The reason is that since a beam width of the CSI-RS is narrower than the beam width of the SS block, a plurality of CSI-RS beams is gathered to have a beam width corresponding to one SS block.

In addition, considering that the BFR is CDMed or FDMed with a PRACH for other usage, a general UE capable of applying only one transmission beam at a time to CDMed or FDMed PRACH resources should apply the same transmission beam to the corresponding BFR and PRACH resources. With this feature, it is also possible to omit the associated DL RS information when configuring the BFR. That is, information on the SS block or the CSI-RS associated with the BFR may be shared with the PRACH configuration. That is, for the BFR in which the associated DL RS information is omitted, the UE may implicitly recognize DL RS information associated with the PRACH resource CDMed or FDMed with the corresponding BFR as the associated DL RS information for the corresponding BFR.

As a result, a DL RS configuration (DL RS set configuration 1) for new beam identification may be independent of the DL RS configuration (DL RS set configuration 2) for association with the BFR.

In addition, the DL RSs associated with the BFR may be measured and utilized by the UE even if the DL RSs associated with the BFR are not explicitly included as the new beam candidate. That is, the DL RS resources explicitly or implicitly included in DL RS set configuration 2 may be included as a new beam candidate RS even if the DL RS resources are not explicitly included in DL RS set configuration 1.

For example, in the BFR, only the SS block resources are configured to the associated RS (DL RS set configuration 2) and in the explicit new beam RS configuration, only the CSI-RSs may be configured (DL RS set configuration 1).

(Observation 1)

When the BFRs are associated with the SS blocks, the UE may still measure the SS blocks as a new beam RS regardless of the DL RS set (DL RS set configuration 1) configured for new candidate beam identification.

As described above, as one of main features proposed in this specification, a DL RS type (types of RSs included in DL RS set configuration 2) used in the BFR indication and a DL RS type (types of RSs included in DL RS set configuration 1) configured for finding the new candidate beam may be different from each other.

For example, the DL RS type used in the BFR indication may be 'SS/PBCH block' and the DL RS type configured by the network may be (periodic) CSI-RS resources, or vice versa.

In addition, even the same DL RS type may have different candidate beam sets.

Another main feature proposed in this specification is that when the UE searches the candidate beam, the UE may search the candidate beam including even DL RS set (DL RS resources included in DL RS set configuration 1) which the base station is to utilize in the beam failure recovery and DL RS set (DL RS resources included in DL RS set configuration 2) configured by a DL-UL relationship in the BFR indication. As a result, the new candidate beam RS resource list searched by the UE may include all resources of DL RS set configuration, but an inverse relationship may not be established. That is, the DL RS resources included in DL RS set configuration 2 may not include all of the new candidate beam RS resource lists.

When the UE reports a preferred candidate beam or when the base station indicates the alternative beam, a method for (explicitly or implicitly) reporting (or indicating) each of the RS set in a former case (case of reporting the candidate beam) and the RS set in a latter case (case in which the base station indicates the alternative beam) and a method for combining the RS sets and re-indexing all RS sets and selecting the RS set among all RS sets are also possible. As an example, if there is a candidate DL RS resource list configured by the base station for the PDCCH beam indicating purpose, the DL RS resources included in the list may be automatically included in the new candidate beam RS (DL RS configuration 1).

Here, the 'DL RS set' that the base station is configured to utilize in the case of the beam failure recovery may be (periodic) 'RS set' configured by the base station for the usage of the beam management.

The beam management usage may be known by explicitly or implicitly indicating the resource type through the resource setting or resource set or through an associated reporting parameter.

A representative reporting parameter for beam reporting may be indirectly known through whether a parameter such as Layer 1 reference signal received power (RSRP), channel quality indicator (CQI), etc. representing the beam quality is included as well as CSI-RS resource set ID, CSI-RS resource ID, CSI-RS port ID, SS block ID, etc. which corresponds to a parameter which may refer to a Tx beam ID of the base station.

In particular, when the BFR(s) is associated with the SS block(s), the UE may implicitly transmit information on the BFR-related beam to the base station by transmitting an SS block alternative beam ID to the corresponding BFR.

In addition, the CSI-RS beam ID (and beam quality information) (with a narrower beam width) may be transmitted through the BFR or a physical uplink shared channel (PUSCH) or a physical uplink control channel (PUCCH) subsequently allocated by the base station.

In this case, the base station and the UE need to appreciate common indexing with respect to the CSI-RS resources (sets) performing the explicit reporting.

That is, when the UE reports an alternative CSI-RS beam, it should be promised (or configured) which CSI-RS resource(s) is to be reported to the base station and on which indexing the CSI-RS resource(s) is to be reported based.

In the CSI-RS indexing, (1) CSI-RS resource (set) indexing configured for periodic CSI-RS based periodic beam reporting may be followed as it is or (2) CSI-RS resources (set) indexing to be used for reporting may be configured separately during the beam recovery process (or after the corresponding process).

When there is no alternative beam among predetermined (periodic) CSI-RS resources, the network reconfigures the aperiodic CSI-RS to perform the associated beam reporting.

The presence or absence of the alternative beam among the predetermined (periodic) CSI-RS resources may be indirectly known through a Quasi-Co Location (QCL) relationship between the CSI-RS and the SS block (from the viewpoint of the spatial RX parameter).

Here, the 'QCL relation indication from the viewpoint of the spatial RX parameter' may mean receiving (or transmitting) corresponding signals in the same or similar beam direction.

A fact that specific DL RS resources are spatially QCLed in the NR indicates that the corresponding DL RSs are identical from the viewpoint of a specific spatial domain parameter (e.g., dominant angle of departure) and may be interpreted as a meaning that the same reception beam may be applied in receiving the corresponding DL RS resources.

Therefore, the transmission beam, that is, a spatial domain filer does not have to be the same between the DL RSs spatially QCLed. For example, when one beam is included in coverage of one beam for two beams with the same or similar beam direction but with different beam widths, an optimal reception beam of the UE is anyway identical with a high probability, and as a result, the base station may indicate the spatial Qcl association between the DL RSs to which respective beams are applied.

For example, it is assumed that SSBs #0, #1, #2, and #3 are connected to BFR #0, #1, #2, and #3, respectively, CSI-RS resource (set) {#0, #1} is indicated to be QCLed with SSB #0, and CSI-RS resource (set) {#2, #3} is indicated to be QCLed with SSB #1.

In addition, the UE assumes that a serving beam (transmitting the DL control channel) is indicated as SSB #0.

When the UE finds an alternative beam, that is, a signal satisfying a specific condition because the quality of the DL control channel deteriorates to a predetermined level as 'SSB #1', the UE may transmit the signal to the base station with BFR #1 connected to SSB #1.

The same UE operation may be performed even when the alternative beam is found in CSI-RS resource (set) #2 or #3.

When there is no signal satisfying the specific condition in the CSI-RS resource (set), but SSB #2 or SSB #3 satisfies the specific condition, it may be implicitly notified to the network that there is no beam satisfying the specific condition among the CSI-RS beams by transmitting the signal through BFR #2 or BFR #3.

Alternatively, on the contrary, when the alternative beam is found in SSB #2 or SSB #3, the corresponding UE may know that there is no alternative beam among predetermined CSI-RSs.

In the above example, when the base station detects the signal in BFR #0 or BFR #1, the beam reporting may be performed (according to predetermined indexing) among the predetermined CSI-RSs.

In addition, when the signal is detected in BFR #2 or BFR #3, the base station may perform the beam reporting based on the indexing while reconfiguring the CSI-RS.

For such an operation, the base station needs to perform an operation of explicitly or implicitly indicating to the UE 'whether to perform beam ID reporting based on a predetermined (periodic) CSI-RS (set) ID' or 'whether to perform the beam ID reporting based on an indicated (aperiodic) CSI-RS resource (set) ID'.

Here, as a representative example of the above implicit method, it may be stated that when a DCI field for simultaneously triggering aperiodic reporting and aperiodic RS/resource is indicated, the latter (beam ID reporting based on the aperiodic CSI-RS resource (set) ID) is recognized and when a DCI field for triggering only the aperiodic reporting is indicated, the former (the beam ID reporting based on the periodic CSI-RS resource (set) ID) is recognized.

Apart from the method described above, a method in which some or all of the SS block resources separately indicated through RMSI, SIB, UE-specific RRC, configuration, etc. for an initial access or mobility usage are included in the candidate beam is also available with respect to the SS block.

In this case, an 8 bit full bitmap for the SS block may be used or a compact form may be used by utilizing the group-bitmap as described above.

As described above, the SS block may be used (or reported or indicated) together with the RS set which the network configures for searching for the new candidate beam in the case of the beam failure recovery, similar to the above-described method.

Alternatively, when there is a separate UE-specific indication with respect to the candidate beam identification, the SS block set may be overridden with RSs to be used for the candidate beam identification after receipt of the corresponding indication.

Further, in terms of base station (e.g., gNB) implementation, the following two options are possible and the options need to be supported in the NR.

(Option 1)

Option 1 represents a case where a spatial coverage (or beam width) of the CSI-RS resource for beam management is narrower than the spatial coverage of the SS block.

(Option 2)

Option 2 represents a case where a spatial coverage (or beam width) of the CSI-RS resource for beam management is the same as the spatial coverage of the SS block.

In option 1 described above, the spatial coverage of the SS block may be covered by multiple CSI-RS resources, each having a different beamforming direction.

When the BFRs are associated with the SS blocks, which SS blocks are included or excluded may depend on the choice of the network.

When the network (or base station) desires to provide the UE with a sufficient opportunity for the beam failure recovery, the network may, for example, provide a sufficient number of BFRs covering an entire cell area to each UE.

When the network wants to save the PRACH resources, a small set of BFRs may be configured to each UE.

For a good operation of the beam failure recovery, it is clear that the BFR needs to cover as wide spatial coverage as possible.

However, in terms of the periodic CSI-RS based beam management, since the network already knows which SS block has the best quality for the UE during the initial access procedure, the UE need not search for the CSI-RS beam through the entire cell coverage.

Although the CSI-RS resources may be shared among multiple UEs, the CSI-RS may be configured to be UE-specific so that the overhead of RS/measurement/reporting may be optimized for the UE.

(Observation 2)

From the viewpoint of the UE, aggregated spatial coverage of the configured periodic CSI-RS resources may be narrower than the aggregated spatial coverage of the SS blocks of the serving cell.

FIG. 16 is a diagram illustrating an example of spatial coverage of CSI-RS and SS blocks that may be applied to a method proposed by this specification.

In FIG. 16, reference numeral 1610 represents spatial coverage by the SSB and reference numeral 1620 represents spatial coverage by the CSI-RS.

That is, FIG. 16 illustrates an implementation (or configuration) scenario in which the periodic CSI-RS has less spatial coverage than the SS block.

In this case, the UE may find an SS block of a better quality than all of the configured CSI-RSs.

The UE may then request the beam failure recovery to the network via the BFR(s) associated with the SS block(s) with a good quality (e.g., the threshold or more, RSRP/CQI better than the RS for the serving control channel).

By supporting such scenarios, sufficient spatial coverage may be provided for the beam failure recovery, while managing a burden of the CSI-RS based beam management as low as possible.

In this regard, when the CSI-RS is configured for the new beam identification, UE operations corresponding to the following three cases may be defined.

(Case 1) The UE discovers at least one CSI-RS resource satisfying a predefined condition.

Here, 'discover' or 'find' may be interpreted in the same meaning as 'select'.

(Case 2) The UE may not find at least one CSI-RS resource satisfying the predefined condition and discovers at least one SS block satisfying a predefined condition.

(Case 3) The UE may not find at least one CSI-RS resource satisfying the predefined condition and recognizes there is no SS block satisfying the predefined condition.

For Case 2 and Case 3, candidate SS blocks may be identified by a UL resource configuration for the beam failure recovery.

The predefined condition may be expressed as a specific condition, for example, a higher quality than a set (or predefined) threshold or a better quality than supporting the CSI-RS/SS block.

In addition, the threshold may refer to a value used to decide whether a candidate beam (identification associated) RS may be used for the beam failure recovery and may be set by the base station.

Hereinafter, the following UE operation will be described in detail for the three cases.

(Proposal 2)

Proposal 2 indicates that when in a case where the CSI-RS is configured for new beam identification, when the beam failure event occurs (i.e., when all serving control channels fail), the same UE operations as the following cases may be defined.

(Case 1) Case where the UE finds at least one CSI-RS resource satisfying a predefined condition, Here, the predefined condition may be (i) a case where the quality is higher than a set (or predefined) threshold or (ii) a case where the quality is better than the serving CSI-RS (or SS block).

Further, the predefined condition may be expressed as the specific condition.

(Case 1-1) Case where the BFR is associated to the SS block,

The UE requests the beam failure recovery (to the base station) through the BFR(s) corresponding to the SS block(s) spatially quasi-co-located (QCL) with the CSI-RS(s) satisfying the condition.

As described above, the BFR, which means the beam failure recovery request resource, may refer to a UL resource FDMed, CDMed, or TDMed with the PRACH used for the beam failure recovery request.

An RRC configuration may be supported so that each BFR is associated with the SS block or CSI-RS.

A PRACH sequence may be an example of the BFR.

(Case 1-2) Case where the BFR is directly associated to the CSI-RS(s),

The UE requests the beam failure recovery (to the base station) through the BFR(s) corresponding to the CSI-RS(s) satisfying the condition.

(Case 2) Case where the UE may not find the CSI-RS resource satisfying the predefined condition and discovers at least one SS block from the BFR configuration satisfying the predefined condition, The UE requests the beam failure recovery through the BFR(s) corresponding to the SS block(s) satisfying the predefined condition.

Similarly, the predefined condition may be (i) a case where the quality is higher than a set (or predefined) threshold or (ii) a case where the quality is better than the serving CSI-RS (or SS block).

(Case 3) Case where the UE may not find the CSI-RS resource satisfying the predefined condition and may not discover the SS block from the BFR configuration satisfying the predefined condition, The UE initiates a radio link failure recovery procedure (or initiates an appropriate timer) and/or, The UE performs a higher layer procedure by declaring an unsuccessful beam failure recovery. and/or, The UE does not transmit any signal through the BFR. and/or, The UE transmits signals over multiple BFRs (with different beams per BFR or per sub-resource of each BFR).

The UE operation (for each case) which is described above may be an operation restricted to the SS blocks indicated in the BFR configuration by the SS block.

However, when SS blocks through other UE-specific RRC configurations such as RMSI, SIB, or mobility are included in addition to the SS block indicated in the BFR configuration, the UE operation described in Case 2 may be limited to a case where the UE finds the SS block satisfying the predefined condition and the SS block is included in the BFR configuration.

When the SS block found by the UE is not included in the BFR configuration, the UE may perform a higher layer operation such as a radio link failure operation, perform an operation of giving up the beam recovery, or perform an operation of transmitting signals to a plurality of predetermined BFRs (while rotating the beam).

The similar operation may be performed when the CSI-RS is configured in the BFR configuration in Case 2 and/or the CSI-RS is configured in the BFR configuration in Case 2, and the CSI-RS resource QCLed with the SS block found by the UE does not belong to the corresponding configuration.

Here, the 'predefined condition' may be applied not only to a predefined condition but also to a condition configured by the network.

Next, the design of the beam failure recovery request resource will be described in detail.

First, the beam failure recovery request resource may be a PRACH-like resource such as PRACH.

The NR supports the use of resources CDMed with other PRACH resources as the beam failure recovery request resource.

The CDM-based design for the beam failure recovery request resource is very efficient and may have less impact on a standard specification.

The configuration is UE-specific so that the network may manage all resources, and may perform reconfiguration by the RRC when coordination is needed.

When the network determines that sequence resources are not sufficient, the network may configure the FDMed resource to the UE.

Further, a resource CDMed with another PRACH resource may be used for transmission of the beam failure recovery request on the PRACH.

Second, the physical uplink control channel (PUCCH) may be used as the beam failure recovery request resource.

In the case of the NR, the beam failure is declared only when all of the serving control channels are successful.

Thus, when all of the serving control channels fail, it may be safer to use a PRACH-like resource that is more robust to a timing error and is potentially larger coverage.

For the latter condition (using the PUCCH), the PUCCH resource may be used for a fast beam fail recovery request.

The reason is that, assuming that at least one PUCCH is associated with each PDCCH beam, one of the UL beam pair links may still be alive.

That is, if a subset of the serving control channel fails, the PUCCH is used to notify the network of the occurrence of the event.

Here, the event may be a beam failure recovery request for notifying that the beam failure occurs.

When all of the serving control channels fail (i.e., beam failure), the PRACH may be used to request the beam failure recovery.

Next, the new beam identification will be described in more detail.

In FIG. 16 and the scenario of the options described above, when the new candidate beam may be found between the configured CSI-RSs, the UE may directly report a CSI-RS resource indicator (CRI) to the base station without any additional RS reception or measurement.

Thus, the DL RS configuration for new beam identification and reporting may be independent of the DL RS configuration for association with the BFR.

For example, the SS blocks may be associated with the BFR while a predetermined beam is present and the CSI-RSs are configured by the network to report the new beam (via the CRI).

Here, the CSI-RS may be indirectly connected to the PRACH through the QCL association with the SS block as illustrated in FIG. 16.

(Observation 3)

Although a beam with a lower resolution may be found among the SSBs associated with the PRACHs, the UE may find a new beam with a higher resolution among the periodic CSI-RS resources.

Observation 3 indicates that the SSB and the PRACH are directly associated with each other and the CSI-RS is indirectly associated with the PRACH.

That is, the CSI-RS is indirectly associated with the PRACH through the QCL association with the SSB.

Here, Observation 3 may correspond to a case where both the SSB and the CSI-RS have a better quality than the threshold set by the base station (serving as a reference of the candidate beam configuration).

Here, the quality may indicate the RSRP or CQI.

That is, Observation 3 may correspond to a case where the UE finds (or selects) both the SSB and the CSI-RS as the candidate beam RS having the better quality than the threshold.

(Proposal 3)

Proposition 3, both the CSI-RSs and the SSBs may be used for the new beam identification, as configured below.

The SSB(s) are directly associated with the PRACHs.

The CSI-RSs are indirectly associated with the PRACHs through the QCB association with the SSB(s).

(Proposal 4)

When the SSBs are directly associated with the PRACHs for the beam failure recovery request and the periodic CSI-RS resources are QCLed with one or more SSBs, UE operations described in the following cases may be defined I the case of occurrence of the beam failure.

(Case 1) Case where the UE finds at least one CSI-RS resource satisfying a predefined condition, The UE requests the beam failure recovery through the PRACH(s) corresponding the SS blocks and the SS blocks are spatially QCLed with the CSI-RS(s) satisfying a specific condition (or a predefined condition).

In Case 1, the network does not need to transmit (or indicate) the CSI-RS for beam refinement and has only to allocate a UL container for reporting CRI+L1-reference signal received power (RSRP) (to the UE).

Here, the predefined condition (or specific condition) may be (i) a case where the quality is higher than a set (or predefined) threshold or (ii) a case where the quality is better than the serving CSI-RS (or SS block).

(Case 2) Case where the UE may not find the CSI-RS resource satisfying the predefined condition and finds at least one SS block satisfying the predefined condition, The UE requests the beam failure recovery through BFR(s) corresponding to the SS blocks satisfying the predefined condition.

In Case 2, the network needs to find a coarse beam based on the SSB and then trigger a CSI-RS based beam refinement procedure.

(Case 3) Case where the UE may not find the CSI-RS resource satisfying the predefined condition and may not discover the SS block from the PRACH configuration satisfying the predefined condition, The UE initiates the radio link failure recovery procedure.

The beam failure recovery procedure may not handle such a situation.

FIG. 17 is a flowchart illustrating an example of an operation method of a UE for a beam failure recovery proposed by this specification.

First, the UE receive, from a base station, control information related to a candidate beam configuration for the beam failure recovery (S1710).

Here, the control information includes an RS set including reference signals (RSs) associated with candidate beam identification and a threshold for the beam failure recovery.

Here, the threshold may refer to a threshold used to decide whether a candidate beam identification associated RS may be used for the beam failure recovery.

The RS set may include at least one of at least one synchronization signal (SS) block or at least one channel state information (CSI)-RS.

In addition, the UE selects an RS having a quality of the threshold or more among the candidate beam identification associated RSs (S1720).

Here, the quality may indicate the RSRP, the CQI, etc.

In addition, the UE transmit, to the base station, the beam failure recovery request based on an uplink (UL) resource related to the selected RS.

Here, the UL resource associated with the selected RS may include both (i) a meaning of a case where the selected RS and the UL resource are associated with each other and (ii) a meaning of a case where the candidate beam RS satisfying the above-mentioned specific condition, which has a Qcl association with the selected RS and the UL resource are associated with each other.

Here, the UL resource may be a resource associated with the physical random access channel (PRACH).

More specifically, the UL resource may be the PRACH preamble and in particular, may be the contention-free physical random access channel (PRACH) preamble.

The selected RS is the SS block or the CSI-RS.

First, when the selected RS is the SS block, the UL resource is associated with the SS block. For more detailed contents, the above-mentioned contents will be referred to.

Next, when the selected RS is the CSI-RS, the UL resource may be a resource corresponding to the SS block which is quasi-co located (QCL) with the CSI-RS.

In addition, the SS block may be associated with the UL resource.

In this case, the SS block may be directly associated with the UL resource and the CSI-RS may be indirectly associated with the UL resource through the QCL association with the SS block.

In addition, the SS block and the CSI-RS are candidate beam RSs satisfying the predefined condition (or specific condition).

FIG. 18 is a flowchart illustrating an example of an operation method of a base station for a beam failure recovery proposed by this specification.

First, the base station transmits, to the base station, the control information associated with the candidate beam configuration for the beam failure recovery (S1810).

Here, the control information may include an RS set including the reference signals (RSs) associated with the candidate beam identification and the threshold for the beam failure recovery.

In addition, the base station receives, from the UE, the beam failure recovery request based on an uplink (UL) resource associated with a specific RS (S1820).

Here, the specific RS may be an RS having a quality of the threshold or more among the RSs related to the candidate beam identification.

In addition to the mentioned contents described in the description associated with FIG. 18, for the same contents as FIG. 17, FIG. 17 will be referred to.

Overview of Devices to which Present Invention is Applicable

FIG. 19 illustrates a block diagram of a wireless communication apparatus according to an embodiment of the present invention.

Referring to FIG. 19, a wireless communication system includes a base station (or network) 1910 and a UE.

The base station 1910 includes a processor 1911, a memory 1912, and a communication module 1913.

The processor 1911 implements a function, a process, and/or a method which are proposed in FIGS. 1 to 18 above. Layers of a wired/wireless interface protocol may be implemented by the processor 1911. The memory 1912 is connected with the processor 1911 to store various pieces of information for driving the processor 1911. The communication module 1913 is connected with the processor 1911 to transmit and/or receive a radio signal.

The communication module 1913 may include a radio frequency (RF) unit for transmitting/receiving a radio signal.

The UE 1920 includes a processor 1921, a memory 1922, and a communication module (or RF unit) 1923. The processor 1921 implements a function, a process, and/or a method which are proposed in FIGS. 1 to 18 above. The layers of the wireless interface protocol may be implemented by the processor 1921. The memory 1922 is connected with the processor 1921 to store various pieces of information for driving the processor 1921. The communication module 1923 is connected with the processor 1921 to transmit and/or receive a radio signal.

The memories 1912 and 1922 may be positioned inside or outside the processors 1911 and 1921 and connected with the processors 1911 and 1921 by various well-known means.

Further, the base station 1910 and/or the UE 1920 may have a single antenna or multiple antennas.

FIG. 20 illustrates a block diagram of a communication device according to an embodiment of the present invention.

In particular, FIG. 20 is a diagram more specifically illustrating the UE of FIG. 19 above.

Referring to FIG. 20, the UE may be configured to include a processor (or a digital signal processor (DSP) 2010, an RF module (or RF unit) 2035, a power management module 2005, an antenna 2040, a battery 2055, a display 2015, a keypad 2020, a memory 2030, a subscriber identification module (SIM) card 2025 (this component is optional), a speaker 2045, and a microphone 2050. The UE may also include a single antenna or multiple antennas.

The processor 2010 implements a function, a process, and/or a method which are proposed in FIGS. 1 to 18 above. The layers of the wireless interface protocol may be implemented by the processor.

The memory 2030 is connected with the processor and stores information related with an operation of the processor. The memory may be positioned inside or outside the processor and connected with the processor by various well-known means.

A user inputs command information such as a telephone number or the like by, for example, pressing (or touching) a button on the keypad 2020 or by voice activation using the microphone 2050. The processor 2010 receives such command information and processes to perform appropriate functions including dialing a telephone number. Operational data may be extracted from the SIM card 2025 or the memory 2030. In addition, the processor 2010 may display command information or drive information on the display 2015 for the user to recognize and for convenience.

The RF module 2035 is connected with the processor 2010 to transmit and/or receive an RF signal. The processor 2010 transfers the command information to the RF module 2035 to initiate communication, for example, to transmit radio signals constituting voice communication data. The RF module 2035 is constituted by a receiver and a transmitter for receiving and transmitting the radio signals. The antenna 2040 functions to transmit and receive the radio signals. Upon receiving the radio signals, the RF module 2035 may transfer the signal for processing by the processor 2010 and convert the signal to a baseband. The processed signal may be converted into to audible or readable information output via the speaker 2045.

FIG. 21 is a diagram illustrating an example of an RF module of the wireless communication device to which the method proposed by this specification may be applied.

Specifically, FIG. 21 illustrates an example of an RF module that may be implemented in a frequency division duplex (FDD) system.

First, in a transmission path, the processors described in FIGS. 19 and 20 process the data to be transmitted and provide an analog output signal to the transmitter 2110.

Within the transmitter 2110, the analog output signal is filtered by a low pass filter (LPF) 2111 to remove images caused by a digital-to-analog conversion (ADC) and up-converted to an RF from a baseband by an up-converter (mixer) 2112, and amplified by a variable gain amplifier (VGA) 2113 and the amplified signal is filtered by a filter 2114, additionally amplified by a power amplifier (PA) 2115, routed through a duplexer(s) 2150/an antenna switch(es) 2160, and transmitted through an antenna 2170.

In addition, in a reception path, the antenna 2170 receives signals from the outside and provides the received signals, which are routed through the antenna switch(es) 2160/duplexers 2150 and provided to a receiver 2120.

In the receiver 2120, the received signals are amplified by a low noise amplifier (LNA) 2123, filtered by a bans pass filter 2124, and down-converted from the RF to the baseband by a down-converter (mixer) 2125.

The down-converted signal is filtered by a low pass filter (LPF) 2127 and amplified by a VGA 1127 to obtain an analog input signal, which is provided to the processors described in FIGS. 19 and 20.

Further, a local oscillator (LO) generator 2140 also provides transmitted and received LO signals to the up-converter 2112 and the down-converter 2125, respectively.

In addition, a phase locked loop (PLL) 2130 receives control information from the processor to generate the transmitted and received LO signals at appropriate frequencies and provides control signals to the LO generator 2140.

Further, circuits illustrated in FIG. 21 may be arranged differently from the components illustrated in FIG. 21.

FIG. 22 is a diagram illustrating another example of the RF module of the wireless communication device to which the method proposed by this specification may be applied.

Specifically, FIG. 22 illustrates an example of an RF module that may be implemented in a time division duplex (TDD) system.

A transmitter 2210 and a receiver 2220 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 21.

A signal amplified by a power amplifier (PA) 2215 of the transmitter is routed through a band select switch 2250, a band pass filter (BPF) 2270, and an antenna switch(es) 2280 and transmitted via an antenna 2280.

In addition, in a reception path, the antenna 2280 receives signals from the outside and provides the received signals, which are routed through the antenna switch(es) 2270, the band pass filter 2260, and the band select switch 2250 and provided to the receiver 2220.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Although the method for performing the beam failure recovery in the wireless communication system of the present invention has been described with reference to an example applied to a 3GPP LTE/LTE-A system or a 5G system, the method may be applied to various wireless communication systems in addition to the 3GPP LTE/LTE-A system or 5G system.

What is claimed is:

1. A base station for performing a beam failure recovery in a wireless communication system, the base station comprising:
a radio frequency (RF) module for transmitting and receiving a radio signal; and
a processor functionally connected with the RF module, wherein the processor is configured to:
transmit, to a user equipment (UE), control information related to a candidate beam configuration for the beam failure recovery,
wherein the control information includes a reference signal (RS) set including reference signals (RSs) related to candidate beam identification and a threshold for the beam failure recovery;
receive, from the UE, a beam failure recovery request,
wherein the beam failure recovery request is received based on an uplink (UL) resource related to a specific RS,
wherein the specific RS is a RS that satisfies a threshold criterion among the RSs related to the candidate beam identification,
wherein the UL resource is a resource related to a physical random access channel (PRACH),
wherein the RS set includes at least one synchronization signal (SS) block and at least one channel state information (CSI)-RS,
wherein, based on the specific RS is an SS block, the UL resource is an uplink (UL) resource corresponding to the SS block, and
wherein, based on the specific RS is a CSI-RS, the UL resource is an uplink (UL) resource corresponding to an SS block which is quasi co-located (QCL) with the CSI-RS.

2. The base station of claim 1, wherein the UL resource is a physical random access channel (PRACH) preamble.

3. The base station of claim 1, wherein the SS block is an SS block which is quasi co-located (QCL) with the CSI-RS in terms of a spatial Rx parameter.

4. The base station of claim 3, wherein the SS block is directly associated with the UL resource, and
wherein the CSI-RS is indirectly associated with the UL resource through a QCL association with the SS block.

5. The base station of claim 1, wherein the quality is reference signal received power (RSRP).

6. The base station of claim 1, wherein the UL resource is associated with one SS block and associated with one or more CSI-RSs.

7. An apparatus comprising:
at least one processor; and
at least one memory operably connectable to the at least one processor and storing instructions that, when executed by the at least one processor, perform operations comprising:
transmitting, to a user equipment (UE), control information related to a candidate beam configuration for a beam failure recovery,
wherein the control information includes a reference signal (RS) set including reference signals (RSs) related to candidate beam identification and a threshold for the beam failure recovery;
receiving, from the UE, a beam failure recovery request,
wherein the beam failure recovery request is received based on an uplink (UL) resource related to a specific RS,
wherein the specific RS is a RS that satisfies a threshold criterion among the RSs related to the candidate beam identification,
wherein the UL resource is a resource related to a physical random access channel (PRACH),
wherein the RS set includes at least one synchronization signal (SS) block and at least one channel state information (CSI)-RS,
wherein, based on the specific RS is an SS block, the UL resource is an uplink (UL) resource corresponding to the SS block, and
wherein, based on the specific RS is a CSI-RS, the UL resource is an uplink (UL) resource corresponding to an SS block which is quasi co-located (QCL) with the CSI-RS.

8. The apparatus of claim 7, wherein the UL resource is a physical random access channel (PRACH) preamble.

9. The apparatus of claim 7, wherein the SS block is an SS block which is quasi co-located (QCL) with the CSI-RS in terms of a spatial Rx parameter.

10. The apparatus of claim 9, wherein the SS block is directly associated with the UL resource, and
wherein the CSI-RS is indirectly associated with the UL resource through a QCL association with the SS block.

11. The apparatus of claim 7, wherein the quality is reference signal received power (RSRP).

12. The apparatus of claim 7, wherein the UL resource is associated with one SS block and associated with one or more CSI-RSs.

13. An apparatus comprising:
at least one processor; and
at least one memory operably connectable to the at least one processor and storing instructions that, when executed by the at least one processor, perform operations comprising:

receiving, from a base station, control information related to a candidate beam configuration for a beam failure recovery, wherein the control information includes a reference signal (RS) set including reference signals (RSs) related to candidate beam identification and a threshold for the beam failure recovery;

selecting, among the RSs related to the candidate beam identification, a specific RS that satisfies a threshold criterion; and transmitting, to the base station, a beam failure recovery request based on an uplink (UL) resource related to the specific RS, wherein the UL resource is a resource related to a physical random access channel (PRACH), wherein the RS set includes at least one synchronization signal (SS) block and at least one channel state information (CSI)-RS, wherein, based on the specific RS is an SS block, the UL resource is an uplink (UL) resource corresponding to the SS block, and wherein, based on the specific RS is a CSI-RS, the UL resource is an uplink (UL) resource corresponding to an SS block which is quasi co-located (QCL) with the CSI-RS.

14. The apparatus of claim 13, wherein the UL resource is a physical random access channel (PRACH) preamble.

15. The apparatus of claim 13, wherein the SS block is an SS block which is quasi co-located (QCL) with the CSI-RS in terms of a spatial Rx parameter.

16. The apparatus of claim 15, wherein the SS block is directly associated with the UL resource, and wherein the CSI-RS is indirectly associated with the UL resource through a QCL association with the SS block.

17. The apparatus of claim 13, wherein the quality is reference signal received power (RSRP).

18. The apparatus of claim 13, wherein the UL resource is associated with one SS block and associated with one or more CSI-RSs.

* * * * *